United States Patent
Aradachi

(10) Patent No.: US 11,330,845 B2
(45) Date of Patent: May 17, 2022

(54) AEROSOL GENERATION SYSTEM AND POWER SUPPLY DEVICE WITH FIRST AND SECOND SLEEP MODES

(71) Applicant: Japan Tobacco Inc., Tokyo (JP)

(72) Inventor: Takao Aradachi, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 17/465,863

(22) Filed: Sep. 3, 2021

(65) Prior Publication Data
US 2022/0071303 A1    Mar. 10, 2022

(30) Foreign Application Priority Data

Sep. 7, 2020   (JP) .............................. JP2020-150107

(51) Int. Cl.
*H02J 7/00*    (2006.01)
*A24F 40/46*   (2020.01)
(Continued)

(52) U.S. Cl.
CPC .............. *A24F 40/57* (2020.01); *A24F 40/46* (2020.01); *H02J 7/007182* (2020.01);
(Continued)

(58) Field of Classification Search
CPC ..... H02J 7/007182; H02J 7/342; A24F 40/57; A24F 40/46
(Continued)

(56) References Cited

U.S. PATENT DOCUMENTS

| 6,650,086 | B1 * | 11/2003 | Chang ................. | H01M 50/597 320/105 |
| 8,294,425 | B2 * | 10/2012 | Aradachi .............. | H02J 7/0013 320/116 |

(Continued)

FOREIGN PATENT DOCUMENTS

| CN | 111669982 A | * | 9/2020 | ......... H02J 7/00043 |
| EP | 2573900 A1 | * | 3/2013 | ............. H02J 50/12 |

(Continued)

OTHER PUBLICATIONS

Notice of Reasons for Refusal dated Nov. 30, 2020, received for JP Application 2020-150107, 11 pages including English Translation.
(Continued)

*Primary Examiner* — John T Trischler
(74) *Attorney, Agent, or Firm* — Xsensus LLP

(57) ABSTRACT

A aerosol generation system comprising: a controller for an inhalation device, the controller including a first power supply, a first connector, and a first processor configured to perform energization control of a heater which is used to heat an aerosol source, and a power supply device including a second power supply, a second connector which is electrically connected to the first connector at the time of charging of the first power supply, and a second processor configured to perform control of power supply from the second power supply to the controller via the second connector, wherein the first processor has a first operation mode and a first sleep mode, and the second processor has a second operation mode and a second sleep mode.

17 Claims, 10 Drawing Sheets

US 11,330,845 B2

Page 2

(51) Int. Cl.
*A24F 40/90* (2020.01)
*A24F 40/57* (2020.01)
*H02J 7/34* (2006.01)

(52) U.S. Cl.
CPC ............... *H02J 7/342* (2020.01); *A24F 40/90* (2020.01); *H02J 7/00036* (2020.01); *H02J 7/0047* (2013.01)

(58) Field of Classification Search
USPC .................................................. 320/103, 127
See application file for complete search history.

(56) References Cited

U.S. PATENT DOCUMENTS

| | | | | |
|---|---|---|---|---|
| 8,330,414 | B2* | 12/2012 | Takahashi | H02J 50/60 320/108 |
| 9,167,853 | B2* | 10/2015 | Xiang | H02J 7/0091 |
| 9,220,304 | B2* | 12/2015 | Greim | A24F 40/85 |
| 9,247,773 | B2* | 2/2016 | Memari | A24F 40/40 |
| 9,320,301 | B2* | 4/2016 | Memari | H02J 7/0044 |
| 9,362,779 | B2* | 6/2016 | Takahashi | H02J 50/60 |
| 9,407,109 | B2* | 8/2016 | Takahashi | H01M 10/44 |
| 9,655,383 | B2* | 5/2017 | Holzherr | H05B 3/02 |
| 9,668,522 | B2* | 6/2017 | Memari | A24F 40/60 |
| 9,806,549 | B2* | 10/2017 | Liberti | H02J 7/342 |
| 9,848,647 | B2* | 12/2017 | Memari | A24F 40/485 |
| 9,848,648 | B2* | 12/2017 | Memari | B65D 25/005 |
| 9,883,697 | B2* | 2/2018 | Memari | A24F 40/95 |
| 9,913,950 | B2* | 3/2018 | Goodman | A61M 11/041 |
| 9,955,736 | B2* | 5/2018 | Memari | G01F 23/00 |
| 9,955,737 | B2* | 5/2018 | Memari | H02J 7/0042 |
| 9,986,770 | B2* | 6/2018 | Memari | H05K 999/99 |
| 9,993,029 | B2* | 6/2018 | Memari | A24F 40/95 |
| 9,993,030 | B2* | 6/2018 | Memari | A24F 40/60 |
| 9,993,031 | B2* | 6/2018 | Memari | A24F 40/60 |
| 9,993,032 | B2* | 6/2018 | Memari | H02J 7/35 |
| 9,993,033 | B2* | 6/2018 | Memari | A24F 40/40 |
| 9,999,259 | B2* | 6/2018 | Memari | A24F 40/95 |
| 9,999,260 | B2* | 6/2018 | Memari | A24F 40/40 |
| 10,015,995 | B2* | 7/2018 | Memari | G01F 23/00 |
| 10,015,996 | B2* | 7/2018 | Memari | A24F 40/50 |
| 10,021,916 | B2* | 7/2018 | Memari | B65B 3/04 |
| 10,028,536 | B2* | 7/2018 | Memari | H02J 7/00 |
| 10,045,565 | B2* | 8/2018 | Memari | H02J 7/0044 |
| 10,045,566 | B2* | 8/2018 | Memari | H02J 7/0044 |
| 10,051,893 | B2* | 8/2018 | Hoffman | A61M 15/06 |
| 10,092,035 | B2* | 10/2018 | Memari | A24F 40/60 |
| 10,098,383 | B2* | 10/2018 | Alarcon | H02J 7/00 |
| 10,143,235 | B2* | 12/2018 | Memari | H02J 7/35 |
| 10,149,497 | B2* | 12/2018 | Memari | A24F 40/60 |
| 10,159,286 | B2* | 12/2018 | Holzherr | H01R 13/6456 |
| 10,236,708 | B2* | 3/2019 | Schennum | H02J 7/025 |
| 10,285,442 | B2* | 5/2019 | Memari | H02J 7/0044 |
| 10,342,263 | B2* | 7/2019 | Memari | H05K 999/00 |
| 10,349,679 | B2* | 7/2019 | Memari | A24F 40/50 |
| 10,349,680 | B2* | 7/2019 | Memari | H05K 999/00 |
| 10,349,681 | B2* | 7/2019 | Memari | B65B 3/04 |
| 10,357,062 | B2* | 7/2019 | Memari | A24F 15/015 |
| 10,362,807 | B2* | 7/2019 | Memari | H05K 999/99 |
| 10,362,808 | B2* | 7/2019 | Memari | H02J 50/10 |
| 10,368,585 | B2* | 8/2019 | Memari | A24F 40/485 |
| 10,375,998 | B2* | 8/2019 | Memari | H02J 7/0044 |
| 10,437,752 | B2* | 10/2019 | Xu | G06F 13/4068 |
| 10,463,079 | B2* | 11/2019 | Memari | A24F 15/015 |
| 10,537,137 | B2* | 1/2020 | Sur | A24B 15/167 |
| 10,548,350 | B2* | 2/2020 | Greim | A24F 40/90 |
| 10,624,394 | B2* | 4/2020 | Memari | H02J 7/00 |
| 10,631,577 | B2* | 4/2020 | Memari | A24F 40/95 |
| 10,638,796 | B2* | 5/2020 | Memari | A24F 15/015 |
| 10,681,938 | B2* | 6/2020 | Memari | A24F 40/40 |
| 10,687,559 | B2* | 6/2020 | Memari | A24F 40/485 |
| 10,687,560 | B2* | 6/2020 | Memari | B65B 3/04 |
| 10,694,786 | B2* | 6/2020 | Memari | A24F 40/48 |
| 10,701,984 | B2* | 7/2020 | Memari | G01F 23/00 |
| 10,716,334 | B2* | 7/2020 | Memari | A24F 40/50 |
| 10,721,972 | B2* | 7/2020 | Memari | H05K 999/99 |
| 10,734,830 | B2* | 8/2020 | Liu | G01R 31/3648 |
| 10,750,789 | B2* | 8/2020 | Memari | H02J 7/35 |
| 10,770,913 | B2* | 9/2020 | Schennum | H02J 7/0044 |
| 10,806,189 | B2* | 10/2020 | Memari | A24F 40/90 |
| 10,869,974 | B2* | 12/2020 | Akao | A24F 40/10 |
| 10,980,278 | B2* | 4/2021 | Alarcon | H02J 7/0071 |
| 10,986,875 | B2* | 4/2021 | Fisher | H05B 1/0244 |
| 11,083,228 | B2* | 8/2021 | Memari | H02J 7/0044 |
| 11,134,720 | B2* | 10/2021 | Nakano | A24F 40/50 |
| 11,160,313 | B2* | 11/2021 | Marubashi | G05B 15/02 |
| 11,178,911 | B2* | 11/2021 | Marubashi | A24F 40/51 |
| 2005/0127879 | A1* | 6/2005 | Sato | H02J 7/342 320/134 |
| 2006/0103349 | A1* | 5/2006 | Yamamoto | H01M 10/482 320/116 |
| 2008/0231229 | A1* | 9/2008 | Aradachi | H02J 7/045 320/107 |
| 2010/0066305 | A1* | 3/2010 | Takahashi | H01M 10/44 320/108 |
| 2011/0018522 | A1* | 1/2011 | Li | H02J 7/00 323/318 |
| 2011/0121656 | A1* | 5/2011 | Hicks | H02J 1/108 307/80 |
| 2013/0057206 | A1* | 3/2013 | Takahashi | H02J 50/10 320/108 |
| 2013/0192616 | A1* | 8/2013 | Tucker | A61M 15/06 131/328 |
| 2014/0217968 | A1* | 8/2014 | Takahashi | H02J 50/10 320/108 |
| 2014/0348495 | A1* | 11/2014 | Greim | A24F 40/50 392/386 |
| 2014/0354215 | A1* | 12/2014 | Xiang | H02J 7/00 320/107 |
| 2015/0002076 | A1* | 1/2015 | Xiang | A24F 40/50 320/107 |
| 2015/0015186 | A1* | 1/2015 | Xiang | H02J 7/04 320/107 |
| 2015/0020832 | A1* | 1/2015 | Greim | A24F 40/40 131/329 |
| 2015/0097513 | A1* | 4/2015 | Liberti | A24F 40/95 320/103 |
| 2015/0181942 | A1* | 7/2015 | Holzherr | A24F 40/95 131/328 |
| 2015/0236536 | A1* | 8/2015 | Aradachi | H02J 7/007 320/112 |
| 2015/0245654 | A1* | 9/2015 | Memari | A24F 40/95 141/2 |
| 2015/0245655 | A1* | 9/2015 | Memari | H02J 50/10 206/242 |
| 2015/0245656 | A1* | 9/2015 | Memari | H02J 50/10 206/242 |
| 2015/0245657 | A1* | 9/2015 | Memari | A24F 40/60 141/18 |
| 2015/0245662 | A1* | 9/2015 | Memari | B65B 3/04 131/328 |
| 2015/0245663 | A1* | 9/2015 | Memari | H05K 999/00 131/329 |
| 2015/0245664 | A1* | 9/2015 | Memari | H05K 999/99 131/329 |
| 2015/0245665 | A1* | 9/2015 | Memari | A24F 40/485 131/329 |
| 2015/0245666 | A1* | 9/2015 | Memari | H02J 7/00 131/329 |
| 2015/0245667 | A1* | 9/2015 | Memari | H05K 999/99 131/329 |
| 2015/0245668 | A1* | 9/2015 | Memari | H05K 999/99 206/250 |
| 2015/0359266 | A1* | 12/2015 | Memari | H02J 7/35 131/328 |
| 2016/0150824 | A1* | 6/2016 | Memari | H02J 7/0042 131/329 |
| 2016/0192712 | A1* | 7/2016 | Memari | A24F 40/95 141/2 |

(56) References Cited

U.S. PATENT DOCUMENTS

| | | | |
|---|---|---|---|
| 2016/0192713 A1* | 7/2016 | Memari | G01F 23/00 141/2 |
| 2016/0204637 A1* | 7/2016 | Alarcon | A24F 40/85 320/114 |
| 2017/0013875 A1* | 1/2017 | Schennum | A24F 40/95 |
| 2017/0222468 A1* | 8/2017 | Schennum | H02J 7/0029 |
| 2017/0360105 A1* | 12/2017 | Memari | A24F 40/95 |
| 2017/0360106 A1* | 12/2017 | Memari | B65D 25/005 |
| 2017/0360107 A1* | 12/2017 | Memari | H02J 7/0044 |
| 2017/0360108 A1* | 12/2017 | Memari | H05K 999/99 |
| 2017/0360109 A1* | 12/2017 | Memari | B65D 25/005 |
| 2017/0360110 A1* | 12/2017 | Memari | H02J 7/0044 |
| 2017/0360111 A1* | 12/2017 | Memari | H02J 7/0042 |
| 2017/0360112 A1* | 12/2017 | Memari | H05K 999/00 |
| 2017/0360113 A1* | 12/2017 | Memari | A24F 40/95 |
| 2017/0360114 A1* | 12/2017 | Memari | A24F 40/90 |
| 2017/0360115 A1* | 12/2017 | Memari | A24F 15/015 |
| 2017/0360116 A1* | 12/2017 | Memari | H05K 999/99 |
| 2018/0000162 A1* | 1/2018 | Memari | H05K 999/99 |
| 2018/0000163 A1* | 1/2018 | Memari | A24F 15/015 |
| 2018/0020727 A1 | 1/2018 | Hoffman et al. | |
| 2018/0049474 A1* | 2/2018 | Memari | A24F 40/90 |
| 2018/0049475 A1* | 2/2018 | Memari | A24F 40/60 |
| 2018/0140013 A1 | 5/2018 | Sur | H01M 10/4264 |
| 2018/0271158 A1* | 9/2018 | Memari | A24F 40/60 |
| 2018/0271159 A1* | 9/2018 | Memari | A24F 40/50 |
| 2018/0271160 A1* | 9/2018 | Memari | B65D 25/005 |
| 2018/0271161 A1* | 9/2018 | Memari | G01F 23/00 |
| 2018/0271162 A1* | 9/2018 | Memari | A24F 40/60 |
| 2018/0271163 A1* | 9/2018 | Memari | H05K 999/99 |
| 2018/0271164 A1* | 9/2018 | Memari | A24F 40/40 |
| 2018/0271165 A1* | 9/2018 | Memari | H02J 50/10 |
| 2018/0271166 A1* | 9/2018 | Memari | A24F 40/48 |
| 2018/0271167 A1* | 9/2018 | Memari | A24F 40/60 |
| 2019/0021401 A1* | 1/2019 | Alarcon | H02J 7/0071 |
| 2019/0036354 A1* | 1/2019 | Liu | H02J 7/007184 |
| 2019/0069603 A1* | 3/2019 | Memari | H02J 7/00 |
| 2019/0109480 A1* | 4/2019 | Hsu | H02J 7/0029 |
| 2019/0181675 A1* | 6/2019 | Schennum | H02J 7/0029 |
| 2020/0000142 A1* | 1/2020 | Schennum | H02J 7/0047 |
| 2020/0008483 A1* | 1/2020 | Memari | B65D 25/005 |
| 2020/0008484 A1* | 1/2020 | Memari | H02J 7/35 |
| 2020/0008485 A1* | 1/2020 | Memari | H02J 50/10 |
| 2020/0008486 A1* | 1/2020 | Memari | H02J 7/00 |
| 2020/0008487 A1* | 1/2020 | Memari | H05K 999/99 |
| 2020/0008488 A1* | 1/2020 | Memari | A24F 40/50 |
| 2020/0008489 A1* | 1/2020 | Memari | A24F 40/60 |
| 2020/0008490 A1* | 1/2020 | Memari | B65D 25/005 |
| 2020/0008491 A1* | 1/2020 | Memari | A24F 15/015 |
| 2020/0008492 A1* | 1/2020 | Memari | B65B 3/04 |
| 2020/0022420 A1* | 1/2020 | Memari | A24F 40/48 |
| 2020/0108213 A1* | 4/2020 | Akao | A24F 40/10 |
| 2020/0169099 A1* | 5/2020 | Tan | H02J 7/0029 |
| 2020/0214352 A1* | 7/2020 | Memari | H02J 7/35 |
| 2020/0237006 A1* | 7/2020 | Akao | H02J 7/005 |
| 2020/0237011 A1* | 7/2020 | Akao | G06F 1/325 |
| 2020/0245688 A1* | 8/2020 | Yamada | G01R 31/36 |
| 2020/0281276 A1* | 9/2020 | Akao | H01M 10/443 |
| 2020/0281277 A1* | 9/2020 | Akao | A61M 15/06 |
| 2020/0305513 A1* | 10/2020 | Fernando | A24F 40/90 |
| 2020/0343756 A1* | 10/2020 | Liu | G01R 31/3648 |
| 2020/0350783 A1* | 11/2020 | Schennum | H02J 7/025 |
| 2020/0352254 A1* | 11/2020 | Yamada | H02J 7/0071 |
| 2020/0358300 A1* | 11/2020 | Akao | A24F 40/90 |
| 2020/0375260 A1* | 12/2020 | Mizuguchi | A61M 15/06 |
| 2021/0015169 A1* | 1/2021 | Mizuguchi | A24F 40/90 |
| 2021/0022406 A1* | 1/2021 | Minami | A24F 40/30 |
| 2021/0045449 A1* | 2/2021 | Memari | B65B 3/04 |
| 2021/0069434 A1* | 3/2021 | Akao | A24F 40/10 |
| 2021/0077757 A1* | 3/2021 | Akao | A24F 40/60 |
| 2021/0120883 A1* | 4/2021 | Marubashi | A24F 40/46 |
| 2021/0120884 A1* | 4/2021 | Marubashi | G05D 23/24 |
| 2021/0259314 A1* | 8/2021 | O'Hare | A24F 40/46 |
| 2021/0274842 A1* | 9/2021 | James | A24F 40/53 |
| 2021/0274850 A1* | 9/2021 | Marubashi | A24F 40/57 |
| 2021/0274851 A1* | 9/2021 | Nakano | A24F 40/50 |
| 2021/0274852 A1* | 9/2021 | Marubashi | A24F 40/10 |
| 2021/0274853 A1* | 9/2021 | Marubashi | A24F 40/53 |
| 2021/0298356 A1* | 9/2021 | Qiu | A24F 40/46 |

FOREIGN PATENT DOCUMENTS

| | | | | |
|---|---|---|---|---|
| EP | 3738454 A1 | * | 11/2020 | H02J 7/00041 |
| EP | 3738454 A4 | * | 5/2021 | A24F 40/51 |
| JP | 2013-70610 A | | 4/2013 | |
| JP | 2015-504668 A | | 2/2015 | |
| JP | 2017-17905 A | | 1/2017 | |
| JP | 2019-511197 A | | 4/2019 | |
| JP | 2019-524069 A | | 9/2019 | |
| JP | WO2019150546 A1 | * | 11/2020 | H02J 7/00712 |
| JP | 6853388 B2 | * | 3/2021 | H02J 7/00712 |
| JP | 2021058195 A | * | 4/2021 | A24F 40/90 |
| KR | 20200111763 A | * | 9/2020 | A24F 40/51 |
| WO | 2019/082249 A1 | | 5/2019 | |
| WO | 2019/150545 A1 | | 8/2019 | |
| WO | 2019/150546 A1 | | 8/2019 | |
| WO | WO-2019150546 A1 | * | 8/2019 | A24F 40/90 |
| WO | WO-2021172721 A1 | * | 9/2021 | |

OTHER PUBLICATIONS

Decision to Grant dated Mar. 29, 2021, received for JP Application 2020-150107, 5 pages including English Translation.
Extended European Search Report dated Feb. 8, 2022, in corresponding European Patent Application No. 21994277.6.

* cited by examiner

AEROSOL GENERATION SYSTEM AND POWER SUPPLY DEVICE WITH FIRST AND SECOND SLEEP MODES

CROSS-REFERENCE TO RELATED APPLICATION

This application claims priority to and the benefit of Japanese Patent Application No. 2020-150107 filed on Sep. 7, 2020, the entire disclosure of which is incorporated herein by reference.

BACKGROUND OF THE INVENTION

Field of the Invention

The present invention relates to an aerosol generation system, a controller for an inhalation device, and a power supply device.

Description of the Related Art

Japanese Patent Laid-Open No. 2019-524069 describes an aerosol generation system comprising an aerosol generation device that generates an aerosol by heating an aerosol forming substance by a heater, and a charging device (to be also referred to as a power supply device) including a battery and used to charge the aerosol generation device.

There is demand for improvement in the responsiveness to a user operation in aerosol generation systems in addition to power saving. Therefore, for each of the aerosol generation device and the charging device (power supply device) of the aerosol generation system, it is desirable to appropriately switch between an operation mode and a sleep mode in which power consumption is lower than in the operation mode.

SUMMARY OF THE INVENTION

The present invention provides a technique advantageous in, for example, achieving both power saving and an improvement in responsiveness to a user operation in an aerosol generation system.

According to one aspect of the present invention, there is provided an aerosol generation system comprising: a controller for an inhalation device, the controller including a first power supply, a first connector, a first resistor, and a first processor configured to perform energization control of a heater which is used to heat an aerosol source, and a power supply device including a second power supply, a second connector which is electrically connected to the first connector at the time of charging of the first power supply, a second resistor, and a second processor configured to perform control of power supply from the second power supply to the controller via the second connector, wherein the first processor has a first operation mode in which charging of the first power supply can be performed, and a first sleep mode in which power consumption is lower than in the first operation mode, the second processor has a second operation mode in which the control of power supply can be performed, and a second sleep mode in which power consumption is lower than in the second operation mode, the second processor includes a second voltage detection terminal connected to a voltage source via the second resistor, shifts from the second sleep mode to the second operation mode in a case where a voltage detected at the second voltage detection terminal changes from High level to Low level as detection of an electrical connection between the first connector and the second connector, and then starts power supply to the controller, the first processor shifts from the first sleep mode to the first operation mode in accordance with the start of the power supply by the second processor, and the second voltage detection terminal is connected to a ground line via the first resistor in a case where the first connector is connected to the second connector, and the voltage detected at the second voltage detection terminal changes from High level to Low level in accordance with connecting the second voltage detection terminal to the ground line.

Further features of the present invention will become apparent from the following description of exemplary embodiments with reference to the attached drawings.

DESCRIPTION OF THE EMBODIMENTS

Figure 1:
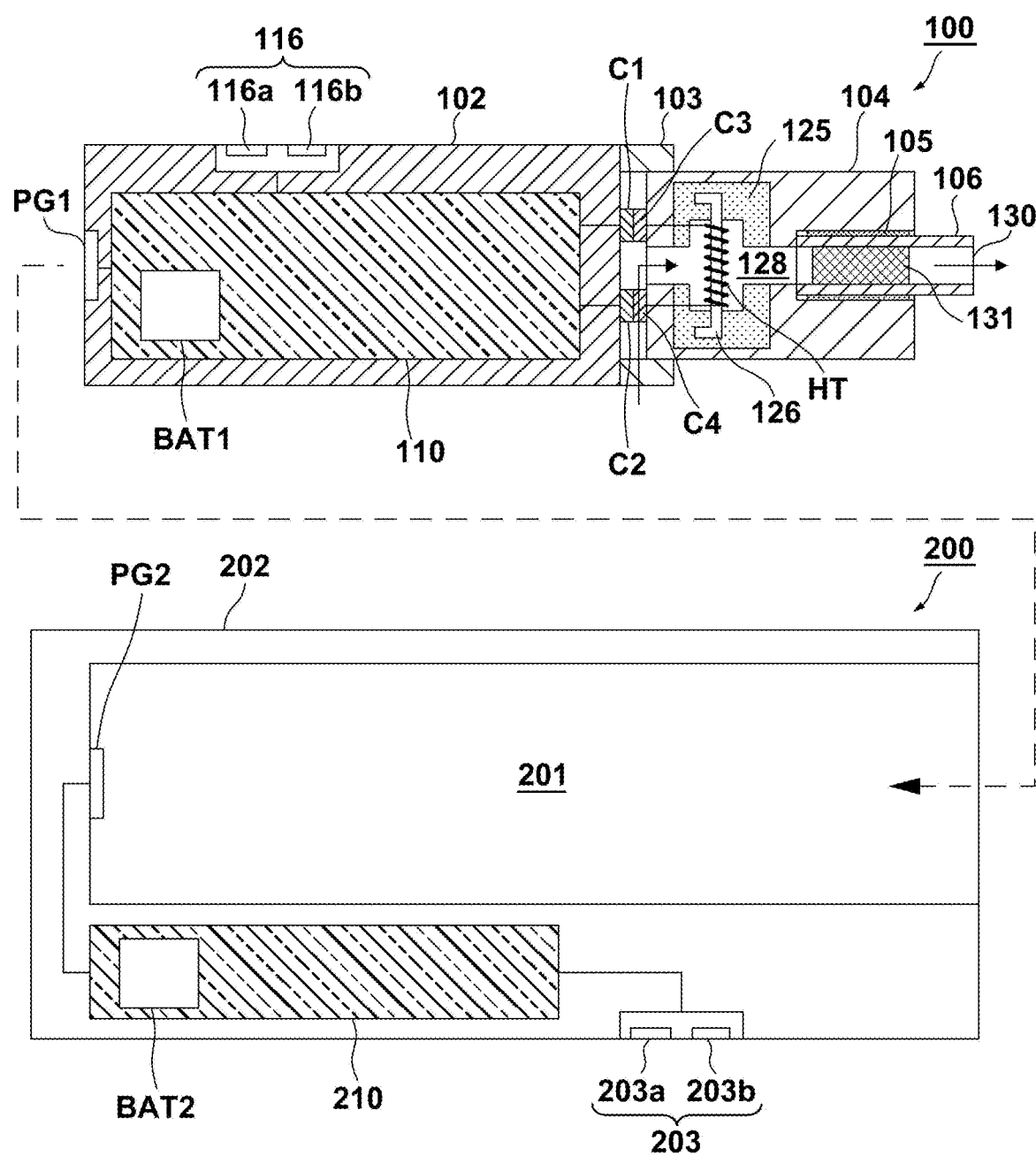
FIG. 1 is a view schematically showing an arrangement example of an aerosol generation system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 schematically shows an arrangement example of an aerosol generation system according to an embodiment. The aerosol generation system can include an inhalation device 100 and an external power supply (power supply device) 200.

The inhalation device 100 can be configured to provide, to a user via a mouthpiece port 130, a gas containing an aerosol, a gas containing an aerosol and a flavor material, an aerosol, or an aerosol containing a flavor material in accordance with an operation requesting the aerosol (to be also referred to as an atomization request hereinafter) such as a inhalation operation by the user. The inhalation device 100 can comprise a controller 102 and an atomizer 104. The inhalation device 100 can comprise a holding portion 103 that detachably holds the atomizer 104. The controller 102 may be understood as a controller for an inhalation device. The atomizer 104 can be configured to atomize an aerosol source. The aerosol source can be, for example, a liquid such as a multivalent alcohol such as glycerin or propylene glycol. Alternatively, the aerosol source may contain a drug.

The aerosol source can be a liquid, a solid, or a mixture of a liquid and a solid. A vapor source such as water may be used in place of the aerosol source.

The inhalation device 100 may further comprise a capsule 106 containing a flavor source 131. The atomizer 104 can include a capsule holder 105 that detachably holds the capsule 106. The capsule holder 105 may be included not in the atomizer 104 but in the controller 102. The flavor source 131 can be a molded body obtained by molding, for example, a cigarette material. Alternatively, the flavor source 131 may be made of a plant (for example, mint, herb, Chinese medicine, coffee beans, or the like) except the cigarette. A fragrance such as menthol may be added to the flavor source. The flavor source 131 may be added to an aerosol source. The atomizer 104 and the capsule holder 105 may be integrally formed in place of an arrangement in which the inhalation device 100 or the atomizer 104 includes the capsule holder 105.

The controller 102 can comprise electrical components 110 including a first power supply BAT1. The first power supply BAT1 may be formed by a secondary battery such as a lithium ion secondary battery, or an electric double-layer capacitor such as a lithium ion capacitor. The electrical components 110 can include a user interface 116. Alternatively, the controller 102 may be understood to include the electrical components 110 and the user interface 116. The user interface 116 can include, for example, a display unit 116a (for example, a light emitting device such as an LED and/or an image display unit such as an LCD) that provides the user with information and/or an operation unit 116b (for example, a switch such as a button switch and/or a touch display) that accepts a user operation. The controller 102 can comprise a first connector PG1 which is electrically connected to a second connector PG2 of the external power supply when the controller 102 is accommodated in an accommodation portion 201 of the external power supply 200, thereby enabling charging by the external power supply 200. The first connector PG1 is not necessarily physically connected to the second connector PG2 to enable charging by the external power supply 200. For example, the second connector PG2 may supply power, in a non-contact manner, to the first connector PG1 which is not physically connected thereto. The first connector PG1 is electrically connected to the electrical components 110. In the example shown in FIG. 1, the first connector PG1 is provided at a position opposite to the position where the atomizer 104 is provided in the controller 102, but the position of the first connector PG1 in the controller 102 can be arbitrary. The first connector PG1 may be a female (concave type) receptacle and the second connector PG2 may be a male (convex type) plug. Alternatively, the first connector PG1 may be a male (convex type) plug and the second connector PG2 may be a female (concave type) receptacle.

The holding portion 103 of the controller 102 can include a first electrical contact C1 and a second electrical contact C2. In a state in which the atomizer 104 is held by the holding portion 103, the first electrical contact C1 of the holding portion 103 can contact a third electrical contact C3 of the atomizer 104, and the second electrical contact C2 of the holding portion 103 can contact a fourth electrical contact C4 of the atomizer 104. The controller 102 can supply power to the atomizer 104 (heater HT) via the first electrical contact C1 and the second electrical contact C2.

The atomizer 104 can include the third electrical contact C3 and the fourth electrical contact C4 described above. In addition, the atomizer 104 can include the heater HT for heating and atomizing the aerosol source, a container 125 for holding the aerosol source, and a transport portion (wick) 126 for transporting the aerosol source held by the container 125 to a heating region of the heater HT and holding the aerosol source in the heating region. At least part of the heating region can be arranged in a channel 128 formed in the atomizer 104. The first electrical contact C1, the third electrical contact C3, the heater HT, the fourth electrical contact C4, and the second electrical contact C2 form a current path for flowing the current to the heater HT. The transport portion 126 can be made of, for example, a fiber element such as a glass fiber, a porous material such as a ceramic, or a combination thereof. Note that the means for transporting the aerosol source held in the container 125 to the heating region is not limited to the wick, but a spraying device such as a spray or a transporting means such as a pump may be used instead.

As described above, the atomizer 104 can include the capsule holder 105 for detachably holding the capsule 106. As an example, the capsule holder 105 can hold the capsule 106 such that part of the capsule 106 is accommodated in the capsule holder 105 or the atomizer 104 and the remaining part of the capsule 106 including the mouthpiece port 130 is exposed. The user can hold the mouthpiece port 130 with his/her mouth and suck the gas containing the aerosol or the aerosol. Since the mouthpiece port 130 is included in the detachable capsule 106 as described above, the inhalation device 100 can be kept clean.

When the user holds the mouthpiece port 130 with his/her mouth and performs the inhalation operation, as exemplified by a solid arrow in FIG. 1, air flows into the channel 128 of the atomizer 104 through an opening (not shown). When the heater HT heats the aerosol source, the vaporized and/or aerosolized aerosol source is transported toward the mouthpiece port 130 with the air. In the process in which the aerosol source is transported toward the mouthpiece port 130, the vaporized and/or aerosolized aerosol source is cooled to form fine liquid droplets. This can promote aerosolization. In the arrangement in which the flavor source 131 is arranged, the flavor material generated by the flavor source 131 is added to this aerosol, and the resultant material is transported to the mouthpiece port 130, thus allowing the user to suck the aerosol containing the flavor material. Since the flavor material generated by the flavor source 131 is added to the aerosol, the flavor material can be efficiently transported to the lungs of the user without staying in the oral cavity.

The external power supply 200 can be configured to supply power to the controller 102 to charge the first power supply BAT1 included in the controller 102 of the inhalation device 100. The external power supply 200 according to this embodiment is, for example, a portable pocket charger, and can be sized to fit in a clothing pocket or bag of the user. The external power supply 200 can comprise a housing 202 including the accommodation portion 201 (accommodation space) where the inhalation device 100 can be accommodated, a user interface 203, and electrical components 210 including a second power supply BAT2. The second power supply BAT2 may be formed by a secondary battery such as a lithium ion secondary battery, or an electric double-layer capacitor such as a lithium ion capacitor. The user interface 203 can include, for example, a display unit 203a (for example, a light emitting device such as an LED and/or an image display unit such as an LCD) that provides the user with information and/or an operation unit 203b (for example, a switch such as a button switch and/or a touch display) that accepts a user operation. The electrical components 210 are provided in the housing 202.

As indicated by a dashed arrow in FIG. 1, the controller 102 of the inhalation device 100 is inserted into the accommodation portion 201 of the external power supply 200. The housing 202 of the external power supply 200 may be configured so as to allow the controller 102 holding the atomizer 104 (the capsule 106 may be attached thereto) to be accommodated in the accommodation portion 201, or may be configured so as to allow the controller 102 alone to be accommodated in the accommodation portion 201. The external power supply 200 can further include, in the accommodation portion 201, the second connector PG2 which is electrically connected to the first connector PG1 of the controller 102 when the controller 102 is accommodated in the accommodation portion 201. Here, the external power supply 200 may comprise a terminal (not shown) such as a USB (Universal Serial Bus) which is electrically connected to, for example, a home power supply to charge the second power supply BAT2 of the external power supply 200. The external power supply 200 may further comprise, in the housing 202, a lid member (not shown) which is configured to be openable/closable with respect to the accommodation portion 201 so as to cover the controller 102 accommodated in the accommodation portion 201.

Figure 2:
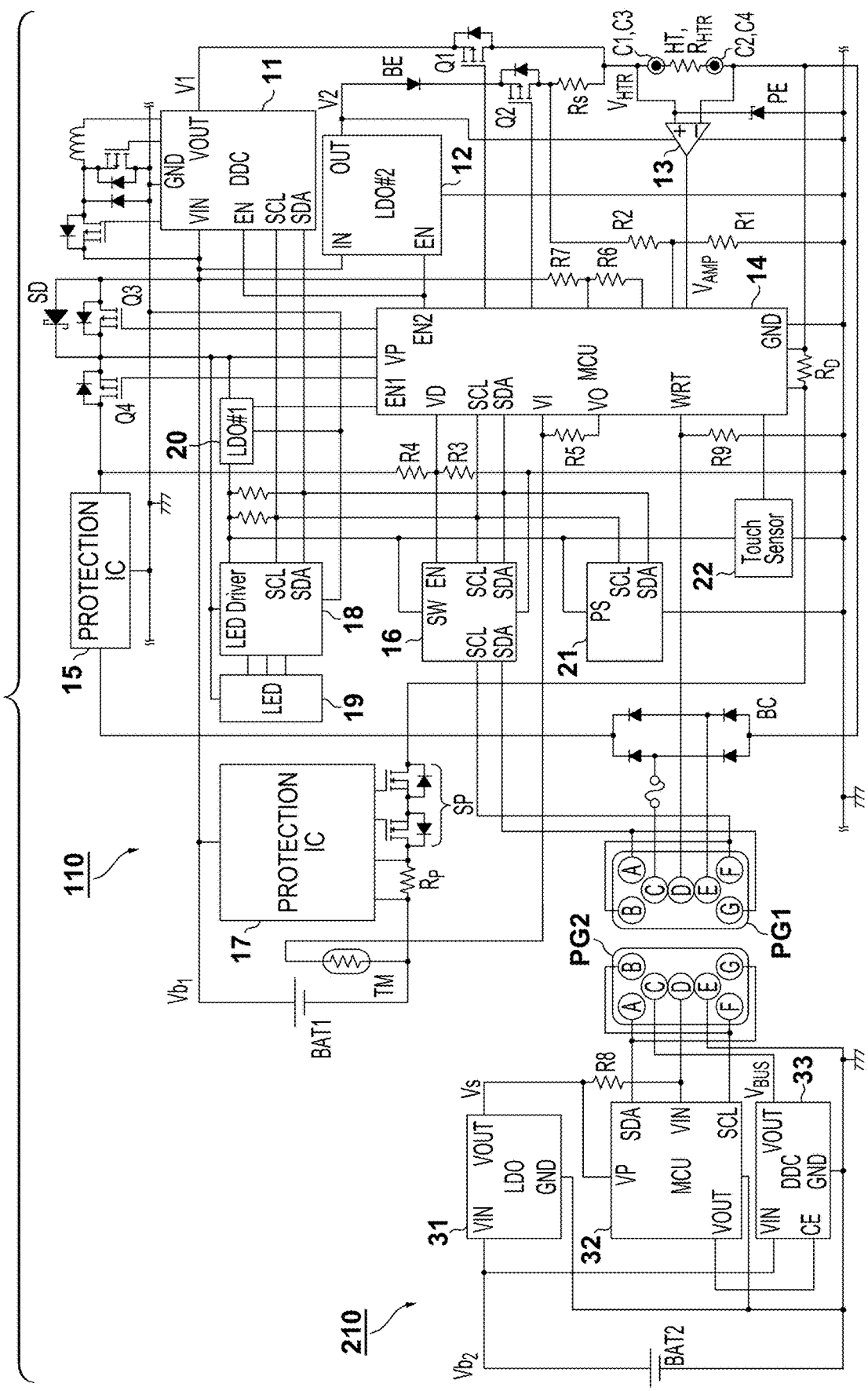
FIG. 2 is a view showing an arrangement example of electrical components of a controller and an arrangement example of electrical components of an external power supply.

FIG. 2 shows an arrangement example of the electrical components 110 of the controller 102 and an arrangement example of the electrical components 210 of the external power supply 200. FIG. 2 also shows the first connector PG1 of the controller 102 and the second connector PG2 of the external power supply 200. Each of the first connector PG1 and the second connector PG2 includes electrical contacts A to G. When the controller 102 is inserted into the accommodation portion 201 of the external power supply 200 and the first connector PG1 is connected to the second connector PG2, the electrical contacts of the first connector PG1 can contact the electrical contacts of the second connector PG2 such that the electrical contacts with the same reference symbols contact each other. Here, in the aerosol generation system according to this embodiment, the controller 102 can be inserted into the accommodation portion 201 of the external power supply 200 in a state in which the orientation of the controller 102 is inverted in the vertical direction in the drawing in FIG. 1. In this case, the electrical contacts A to G of the first connector PG1 contact the electrical contacts G to A of the second connector PG2, respectively. However, even in this case, the controller 102 and the external power supply 200 can be normally operated by the circuit arrangement shown in FIG. 2.

First, the arrangement example of the electrical components 110 of the controller 102 will be described. The electrical components 110 can include, for example, the first power supply BAT1, a power supply unit that supplies power to the atomizer 104 (heater HT thereof), a detection unit for detecting the resistance value of the heater HT, and an energization control unit that controls energization of the heater HT in accordance with the information obtained by the detection unit. The heater HT has a resistance value $R_{HTR}$ that changes in accordance with the temperature of the heater HT. The resistance value may have a positive temperature coefficient characteristic (so-called PTC characteristic) and increase as the temperature of the heater HT increases, or may have a negative temperature coefficient characteristic (so-called NTC characteristic) and increase as the temperature of the heater HT decreases. As has been described above, the third electrical contact C3 of the heater HT contacts the first electrical contact C1 of the controller 102, and the fourth electrical contact C4 of the heater HT contacts the second electrical contact C2 of the controller 102.

The power supply unit that supplies power to the heater HT can include a voltage converter 11 and a switch Q1. The voltage converter 11 includes, for example, a DC/DC converter. The voltage converter 11 converts a voltage $Vb_1$ supplied from the plus terminal of the first power supply BAT1 into a heater driving voltage V1, and outputs it from an output terminal VOUT. The heater driving voltage V1 output from the output terminal VOUT of the voltage converter 11 is supplied to the first electrical contact C1 contacting the third electrical contact C3 of the heater HT. Since the second electrical contact C2 contacting the fourth electrical contact C4 of the heater HT is electrically connected to the minus terminal of the first power supply BAT1, the current path for flowing the current to the heater HT can be formed between the output terminal VOUT of the voltage converter 11 and the minus terminal of the first power supply BAT1. The generated amount of aerosol tends to increase as the voltage applied to the heater HT is higher. Therefore, the voltage converter 11 preferably includes a boost DC/DC converter or a buck-boost DC/DC converter. The switch Q1 includes, for example, a field effect transistor (FET), and opening/closing (ON/OFF) of the switch Q1 can be controlled by a first processor 14. The switch Q1 can be arranged on the line (current path) connecting the output terminal VOUT of the voltage converter 11 and the heater HT (first electrical contact C1), but the present invention is not limited to this, and the switch Q1 may be arranged on the line connecting the heater HT (second electrical contact C2) and the minus terminal of the first power supply BAT1. Note that the diode added to the switch Q1 in FIG. 2 represents the body (parasitic) diode of the field effect transistor.

The detection unit for detecting the resistance value $R_{HTR}$ of the heater HT can include a voltage conversion circuit 12 and an amplifier 13. The voltage conversion circuit 12 includes, for example, a linear regulator such as an LDO (Low DropOut) regulator. The voltage conversion circuit 12 converts the voltage $Vb_1$ supplied from the plus terminal of the first power supply BAT1 into a detection voltage V2 for detecting the resistance value $R_{HTR}$ of the heater HT, and outputs it from an output terminal OUT. The amplifier 13 can include, for example, an operational amplifier which includes a noninverting input terminal, an inverting input terminal, and an output terminal. The positive power supply terminal of the amplifier 13 can be connected to the output terminal OUT of the voltage conversion circuit 12, and the negative power supply terminal thereof can be connected to the ground line. The noninverting input terminal of the amplifier 13 is connected to the first electrical contact C1, and the inverting input terminal thereof is connected to the second electrical contact C2. Accordingly, the potential difference between the first electrical contact C1 and the second electrical contact C2, that is, a voltage $V_{HTR}$ of the heater HT is input to the amplifier 13. An output voltage $V_{AMP}$ of the amplifier 13 can be input to the first processor 14. Note that in the example shown in FIG. 2, a Zener diode PE is provided between the noninverting input terminal of the amplifier 13 and the ground line. The Zener diode PE is used to suppress an unexpected operation or failure of the amplifier 13 caused by an input of an excessive voltage to the noninverting input terminal of the amplifier 13.

The detection unit for detecting the resistance value $R_{HTR}$ of the heater HT can further include a switch Q2 and a shunt resistor Rs ("Rs" may also refer to the resistance value of the shunt resistor Rs hereinafter). Assume that the resistance value of the shunt resistor Rs hardly changes even when the temperature of the shunt resistor Rs changes. The switch Q2 includes, for example, a field effect transistor (FET), and opening/closing (ON/OFF) of the switch Q2 can be controlled by the first processor 14. The switch Q2 can be arranged on the line connecting the output terminal OUT of the voltage conversion circuit 12 and the heater HT (first electrical contact C1), but the present invention is not limited to this, and the switch Q2 may be arranged on the line connecting the heater HT (second electrical contact C2) and the minus terminal of the first power supply BAT1. A diode BE can be provided on the line connecting the output terminal OUT of the voltage conversion circuit 12 and the switch Q2. The shunt resistor Rs can be arranged on the line connecting the switch Q2 and the heater HT in series with the switch Q2. Note that the diode added to the switch Q2 in FIG. 2 represents the body (parasitic) diode of the field effect transistor. In the example shown in FIG. 2, resistors R1 and R2 arranged in series are provided between the line connecting the switch Q2 and the shunt resistor Rs and the ground line, and the voltage between the resistor R1 and the resistor R2 is supplied to the first processor 14.

The noninverting input terminal of the amplifier 13 is connected between the shunt resistor Rs and the heater HT, and the series circuit of the shunt resistor Rs and the heater HT is connected between the output terminal OUT of the voltage conversion circuit 12 and the minus terminal of the first power supply BAT1. That is, a voltage obtained by dividing the detection voltage V2 (the voltage obtained by subtracting a forward voltage Vf of the diode BE to be described later therefrom) by the shunt resistor Rs and the heater HT is input to the noninverting input terminal of the amplifier 13. Since the resistance value $R_{HTR}$ changes in accordance with the temperature of the heater HT, according to the arrangement example of the electrical components 110 of the controller 102 shown in FIG. 2, the amplifier 13 can output the output voltage VW that changes in accordance with the temperature of the heater HT.

In order to detect the resistance value $R_{HTR}$ of the heater HT, the switch Q1 is turned off and the switch Q2 is turned on. In this embodiment, after the switch Q1 is turned on to supply power to the heater HT in accordance with an atomization request from the user, the switch Q2 is turned on and then the switch Q1 is turned off. At this time, letting Vf be the forward voltage of the diode BE and $I_{HTR}$ be the current flowing through the heater HT, the resistance value $R_{HTR}$ of the heater HT is expressed by equation (1):

$$R_{HTR} = V_{HTR}/I_{HTR} = V_{HTR} \cdot (R_{HTR} + R_S)/(V2 - Vf) \quad (1)$$

By modifying equation (1), equation (2) giving the resistance value $R_{HTR}$ is obtained:

$$R_{HTR} = R_S \cdot V_{HTR}/(V2 - Vf - V_{HTR}) \quad (2)$$

If the amplifier 13 of the detection unit has an amplification factor A, the output voltage $V_{AMP}$ of the amplifier 13 is given by equation (3):

$$V_{AMP} = A \cdot V_{HTR} \quad (3)$$

By modifying equation (3), equation (4) giving the voltage $V_{HTR}$ of the heater HT is obtained:

$$V_{HTR} = V_{AMP}/A \quad (4)$$

Thus, the resistance value $R_{HTR}$ of the heater HT can be obtained according to equation (2) and equation (4). Note that the switch Q2 is turned off after the output voltage $V_{AMP}$ of the amplifier 13 used to detect the resistance value $R_{HTR}$ of the heater HT is obtained.

The energization control unit that controls energization of the heater HT can include the first processor 14. The first processor 14 can be formed by, for example, an MCU (Micro Controller Unit), but may be formed by an MCU and an analog circuit. The first processor 14 generates a control signal for controlling energization of the heater HT in accordance with the information obtained by the above-described detection unit (here, the output voltage VW of the amplifier 13). The control signal can be, for example, a signal for controlling opening/closing of the switch Q1, but can include another control signal (for example, a control signal for controlling the display unit 116a). The control signal may be, for example, a control signal for suppressing overheating of the heater HT, or may be a control signal for converging the temperature of the heater HT to a target temperature. Based on the voltage generated in a resistor $R_D$ arranged on the line connecting the minus terminal of the first power supply BAT1 and the heater HT (second electrical contact C2), the first processor 14 can detect a current flowing through the resistor $R_D$, that is, the current of the heater HT. If an overcurrent is detected in the heater HT, the first processor 14 can perform a process of stopping the energization of the heater HT by turning off the switch Q1, or the like.

Based on the resistance value $R_s$, the voltage Vf, the voltage V2, and the output voltage $V_{AMP}$ of the amplifier 13, the first processor 14 can calculate the resistance value $R_{HTR}$ of the heater HT according to the above-described equation (2) and equation (4). The resistance value $R_s$, the voltage Vf, and the voltage V2 are known values. Then, the first processor 14 calculates an estimated temperature $T_{HTR}$ of the heater HT according to following equation (5). The first processor 14 can control opening/closing of the switch Q1 based on the calculated estimated temperature $T_{HTR}$ so that the temperature of the heater HT matches or converges to the target temperature.

$$T_{HTR} = T_{ref} + (1/\alpha) \cdot (R_{HTR} - R_{ref}) \cdot (1/R_{ref}) \cdot 10^6 \quad (5)$$

In equation (5), $T_{ref}$ is the reference temperature of the heater HT. $R_{ref}$ is the reference resistance value of the heater HT, and this is the resistance value $R_{HTR}$ of the heater HT at the reference temperature. α is the temperature coefficient [ppm/° C.] of the heater HT, and this is a known value. Here, the reference temperature can be an arbitrary temperature, and can be stored in a memory of the first processor 14 in association (linking) with the reference resistance value. As the reference temperature, the preset temperature may be used, or the temperature of the heater HT obtained upon acquiring the reference resistance value may be used. The temperature of the heater HT obtained upon acquiring the reference resistance value may be obtained by applying the estimated temperature $T_{HTR}$ of the heater HT newly calculated using the above-described equations (1) to (5), or may be obtained by converting the output of the sensor (for example, a temperature sensor TM) that detects the temperature of an arbitrary portion in the inhalation device 100.

The electrical components 110 of the controller 102 can further comprise a charging circuit for controlling charging of the first power supply BAT1 by the external power supply 200 when the first connector PG1 of the controller 102 is connected to the second connector PG2 of the external power supply 200. The charging circuit can include, for example, a bridge circuit BC, a protection circuit 15, switches Q3 and Q4, and a diode SD. The bridge circuit BC is a circuit that allows the controller 102 and the external power supply 200 to operate normally even if the electrical contacts A to G of the first connector PG1 are inverted and connected to the electrical contacts G to A of the second connector PG2, respectively. The bridge circuit BC can be formed by, for example, four diodes or transistors. The protection circuit 15 is a circuit for preventing an overcurrent from flowing to the first power supply BAT1 of the controller 102 from the external power supply 200 via the first connector PG1 and the second connector PG2.

Each of the switches Q3 and Q4 includes, for example, a field effect transistor (FET), and opening/closing (ON/OFF) of the switches Q3 and Q4 can be controlled by the first processor 14. That is, it can be said that the first processor 14 controls charging to the first power supply BAT1 of the controller 102 by the external power supply 200. The switches Q3 and Q4 are arranged in series on the line connecting the bridge circuit BC and the plus terminal of the first power supply BAT1, and the voltage of the line connecting the switch Q3 and the switch Q4 can be supplied to a power supply terminal VP of the first processor 14. The diode SD is, for example, a Schottky barrier diode, and can be arranged in parallel with the switch Q3. Since the forward voltage of the Schottky barrier diode tends to be smaller than the forward voltage of the body diode, the Schottky barrier diode enables highly efficient power supply from the first power supply BAT1 to the power supply terminal VP of the first processor 14. Note that the diode added to each of the switches Q3 and Q4 in FIG. 2 represents the body (parasitic) diode of the field effect transistor. The first processor 14 may perform dropper control in which, by controlling ON/OFF of the switch Q3, power unnecessary for charging the first power supply BAT1 is discarded as heat from the power supplied from the first connector PG1. When the first processor 14 performs the dropper control using the switch Q3, it is possible to highly control the charging of the first power supply BAT1 without using a dedicated charging IC or the like.

The electrical components 110 of the controller 102 can further comprise a switch circuit 16 and a protection circuit 17. The switch circuit 16 is a circuit that enables communication between the first processor 14 and a second processor 32 of the external power supply 200 when the first connector PG1 is connected to the second connector PG2 and a predetermined voltage is applied to the EN terminal. The protection circuit 17 detects, based on the voltage generated in a resistor $R_p$ arranged on the line connecting the minus terminal of the first power supply BAT1 and the heater HT (second electrical contact C2), the current flowing to the resistor $R_p$, that is, the current of the heater HT. If an overcurrent is detected in the heater HT, the protection circuit 17 performs a process of stopping the energization of the heater HT, or the like. For example, a switch circuit SP formed by field effect transistors or the like is provided on the line connecting the minus terminal of the first power supply BAT1 and the heater HT (second electrical contact C2). If an overcurrent is detected, the protection circuit 17 can stop the energization of the heater HT by turning off the switch circuit SP. Note that the protection circuit 17 can be configured to operate independently of control of the first processor 14.

The electrical components 110 of the controller 102 can further comprise an LED driving circuit 18, a voltage conversion circuit 20, a puff sensor 21, a touch sensor 22, and the temperature sensor TM. The LED driving circuit 18 drives an LED 19 that forms the display unit 116a of the user interface 116. The voltage conversion circuit 20 includes, for example, a linear regulator such as an LDO (Low DropOut) regulator. The voltage conversion circuit 20 converts the voltage $Vb_1$ supplied from the plus terminal of the first power supply BAT1 into a voltage to be input to the switch 16 and the puff sensor 21, and outputs it. The puff sensor 21 (for example, a pressure sensor or a microphone condenser) detects a puff operation of the user, and supplies the detection signal to the first processor 14. The detection of the puff operation using the puff sensor 21 is a specific example of the atomization request described above. The touch sensor 22 forms the operation unit 116b of the user interface 116. If an operation (for example, a touch operation) by the user is detected, the touch sensor 22 supplies the detection signal to the first processor 14. The touch operation on the touch sensor 22 is a specific example of the atomization request described above. The temperature sensor TM is provided to detect the temperature of the first power supply BAT1, and can include, for example, a thermistor whose resistance value changes in accordance with the temperature. The first processor 14 measures the voltage divided by a resistor R5 connected in series with the thermistor serving as the temperature sensor TM and the thermistor to obtain the resistance value of the thermistor. Based on the resistance value of the thermistor, the first processor 14 can calculate the temperature of the first power supply BAT1. Preferably, the temperature sensor TM is installed near the first power supply BAT1 or on the surface of the first power supply BAT1.

Here, in the example shown in FIG. 2, the line connecting the bridge circuit BC (protection circuit 15) and the switch Q4 and the ground line are connected via the resistors R3 and R4. The voltage between the resistor R3 and the resistor R4 can be input to the EN terminal of the switch circuit 16 and a voltage detection terminal VD (first voltage detection terminal) of the first processor 14. The voltage detection terminal VD of the first processor 14 is a terminal for detecting whether a voltage $V_{BUS}$ of a power supply unit 33 of the external power supply 200 is applied (that is, whether power is supplied from the external power supply 200). If a voltage equal to or higher than a predetermined threshold value is detected at the voltage detection terminal VD, the first processor 14 can determine that the voltage $V_{BUS}$ is applied. The voltage $Vb_1$ supplied from the plus terminal of the first power supply BAT1 can be input to the first processor 14 via resistors R6 and R7. The voltage between the resistor R6 and the resistor R7 can also be input to the first processor 14.

Next, the arrangement example of the electrical components 210 of the external power supply 200 will be described. The electrical components 210 can include, for example, the second power supply BAT2, a voltage conversion circuit 31, the second processor 32, and the power supply unit 33. The voltage conversion circuit 31 includes, for example, an LDO (Low DropOut) regulator. The voltage conversion circuit 31 converts a voltage $Vb_2$ supplied from the plus terminal of the second power supply BAT2 into a voltage Vs to be input to a power supply terminal VP of the second processor 32, and outputs it from an output terminal VOUT. That is, the voltage conversion circuit 31 functions as the voltage source of the second processor 32, and the output terminal VOUT of the voltage conversion circuit 31 can be connected to the power supply terminal VP of the second processor 32. The second processor 32 controls power supply from the second power supply BAT2 to the controller 102 by supplying a control signal to the power supply unit 33 and controlling the power supply unit 33. The second processor 32 can be formed by, for example, an MCU (Micro Controller Unit), but may be formed by an MCU and an analog circuit. The power supply unit 33 includes, for example, a DC/DC converter. The power supply unit 33 converts the voltage $Vb_2$ supplied from the plus terminal of the second power supply BAT2 into the voltage $V_{BUS}$, which is used to supply power to the first power supply BAT1 of the controller 102, and outputs it from an output terminal VOUT.

Here, in the example shown in FIG. 2, a resistor R8 (first resistor) is provided on the line connecting the output terminal VOUT of the voltage conversion circuit 31 and the electrical contact D of the second connector PG2. When the first connector PG1 is connected to the second connector PG2, the electrical contact D of the second connector PG2 contacts the electrical contact D of the first connector PG1, and can be connected to the ground line via a resistor R9 (first resistor) of the electrical components 110 of the controller 102. The voltage of the line connecting the resistor R8 and the electrical contact D of the second connector PG2 can be input to an input terminal VIN (second voltage detection terminal) of the second processor 32. In other words, the voltage obtained by dividing the voltage Vs by the resistor R8 and the resistor R9 can be input to the input terminal VIN (second voltage detection terminal) of the second processor 32. In accordance with the change in voltage input to the input terminal VIN, the second processor 32 can detect (determine) whether the first connector PG1 is connected to the second connector PG2. The second processor 32 can control the power supply unit 33 in accordance with the connection between the first connector PG1 and the second connector PG2. For example, if the connection between the first connector PG1 and the second connector PG2 is detected, the second processor 32 can supply, to the power supply unit 33 (CE terminal), a control signal for starting power supply from the second power supply BAT2 to the controller 102. Here, the resistance value of the resistor R8 is preferably larger than that of the resistor R9. As an example, the resistance value of the resistor R8 is 1 MΩ, and the resistance value of the resistor R9 is 100 kΩ. At this time, the input voltage at the power supply terminal of the second processor 32 is equal to the voltage applied to the resistors R8 and R9 connected in series. In other words, at this time, the input voltage at the power supply terminal of the second processor 32 is the voltage Vs.

Figure 3:
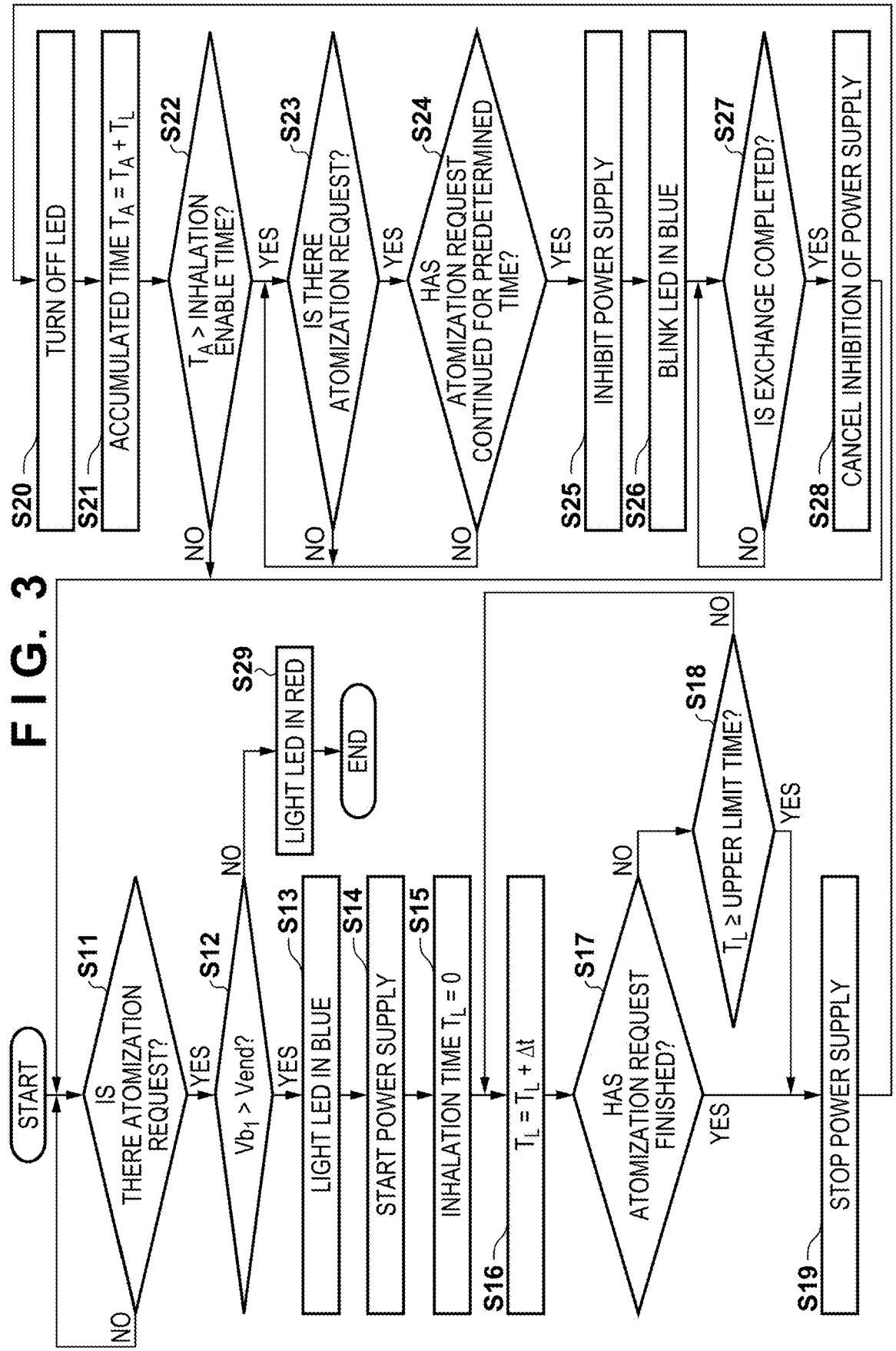
FIG. 3 is a flowchart illustrating an operation example of an inhalation device.

FIG. 3 illustrates an operation example of the inhalation device 100. This operation is a process (atomization process) of heating the aerosol source by the heater HT in accordance with an atomization request from the user and providing the atomized aerosol source from the mouthpiece port 130, and controlled by the first processor 14. The first processor 14 includes a memory storing programs, and a CPU that operates in accordance with the programs.

In step S11, the first processor 14 waits for reception of an atomization request (more specifically, a detection signal transmitted from the puff sensor 21 and/or the touch sensor 22). If the atomization request is received, the first processor 14 executes step S12. The atomization request is a request to operate the atomizer 104, more specifically, a request to control the heater HT within a target temperature range so as to generate an aerosol from the aerosol source. The atomization request can be an operation of detecting by the puff sensor 21 that the user has performed an inhalation operation (puff operation) through the mouthpiece port 130, and notifying the first processor 14 of the detection by the puff sensor 21 (for example, transmission of a detection signal). Alternatively, the atomization request can be an operation of notifying, by the operation unit 116b, the first processor 14 that the user has operated the operation unit 116b (touch sensor 22) (for example, transmission of an operation signal). Hereinafter, during the inhalation operation by the user or during the operation of the operation unit 116b by the user, the atomization request is continuously transmitted from the puff sensor 21 or the operation unit 116b, and the atomization request (transmission thereof) ends when the user terminates the inhalation operation or the operation of the operation unit 116b.

In step S12, the first processor 14 obtains the voltage $Vb_1$ of the first power supply BAT1 from a power supply management circuit (not shown), and determines whether the voltage $Vb_1$ exceeds a discharge end voltage Vend (for example, 3.2 V). If the voltage $Vb_1$ is equal to or lower than the discharge end voltage Vend, this means that the dischargeable remaining amount of the first power supply BAT1 is insufficient. Accordingly, if the voltage $Vb_1$ is equal to or lower than the discharge end voltage Vend, the process advances to step S29, and the first processor 14 gives a notification to prompt charging of the first power supply BAT1 by using the display unit 116a (LED 19) of the user interface 116. For example, this notification can be lighting in red or blinking the LED 19 included in the display unit 116a. When the notification is given, the user inserts the inhalation device 100 (controller 102) into the accommodation portion 201 of the external power supply 200, and connects the first connector PG1 of the controller 102 to the second connector PG2 of the external power supply 200. With this, the first power supply BAT1 of the controller 102 is charged by the external power supply 200, and the dischargeable remaining amount can be increased. On the other hand, if the voltage $Vb_1$ exceeds the discharge end voltage Vend in step S12, the first processor 14 performs a heating process. The heating process is a process of controlling the switch Q1 to supply power to the heater HT in accordance with the reception of the atomization request of the aerosol source, thereby heating the aerosol source. The heating process can include steps S13 to S17.

In step S13, the first processor 14 can notify, using the display unit 116a (LED 19) of the user interface 116, that a normal operation is possible. For example, this notification can be lighting, in blue, of the LED 19 included in the display unit 116a. Then, in step S14, the first processor 14 starts power supply control of the heater HT. The power supply control of the heater HT includes temperature control of controlling the heater HT within the target temperature range. The temperature control can include feedback control of calculating the estimated temperature $T_{HTR}$ of the heater HT by detecting the resistance value $R_{HTR}$ of the heater HT, and controlling opening/closing of the switch Q1 based on the estimated temperature $T_{HTR}$ such that the temperature of the heater HT falls within the target temperature range (for example, the temperature of the heater HT matches or converges to the target temperature).

Then, in step S15, the first processor 14 resets an inhalation time $T_L$ to 0. After that, in step S16, the first processor 14 adds Δt to the inhalation time $T_L$. Δt corresponds to the time interval between the execution of step S16 and the next execution of step S16.

Then, in step S17, the first processor 14 determines whether the atomization request has finished. If the atomization request has finished, the first processor 14 advances to step S19, and stops the power supply control of the heater HT. On the other hand, if the atomization request has not finished, the first processor 14 advances to step S18, and determines whether the inhalation time $T_L$ has reached the upper limit time. If the inhalation time $T_L$ has not reached the upper limit time, the first processor 14 returns to step S16. If the inhalation time $T_L$ has reached the upper limit time, the first processor 14 advances to step S19. As an example, the upper limit time may be between 2.0 and 2.5 sec.

After step S19, in step S20, the first processor 14 turns off the LED 19 which has been lit in blue. The order of step S19 and step S20 may be reversed, or the first processor 14 may simultaneously execute steps S19 and S20. Then, in step S21, the first processor 14 updates an accumulated time $T_A$. More specifically, the inhalation time $T_L$ is added to the current accumulated time $T_A$ in step S21. The accumulated time $T_A$ can be the accumulated time of the capsule 106 used for inhalation. In other words, the accumulated time $T_A$ can be the accumulated time of inhalation of the aerosol via the flavor source 131 of the capsule 106.

In step S22, the first processor 14 determines whether the accumulated time $T_A$ does not exceed the inhalation enable time (for example, 120 sec). If the accumulated time $T_A$ does not exceed the inhalation enable time, this means that the capsule 106 can still provide the flavor material, so that the process returns to step S11. On the other hand, if the accumulated time $T_A$ exceeds the inhalation enable time, the process advances to step S23, and the first processor 14 waits for generation of an atomization request. If an atomization request is generated, in step S24, the first processor 14 waits for the atomization request to continue for a predetermined time. Thereafter, in step S25, the first processor 14 inhibits the power supply control of the heater HT. Note that step S24 may be omitted.

Then, in step S26, the first processor 14 gives a notification to prompt an exchange of the capsule 106 by using the display unit 116a of the user interface 116. For example, this notification can be blinking (repetition of turning on and off), in blue, of the LED 19 included in the display unit 116a. When the notification is given, the user can exchange the capsule 106. In an example, one atomizer 104 and a plurality of (for example, three) capsules 106 can be sold as one set. In such an example, after the one atomizer 104 and all the capsules 106 included in one set are consumed, the atomizer 104 and the last capsule 106 included in the consumed set can be exchanged with the atomizer 104 and the capsule 106 included in a new set. The order of step S25 and step S26 may be reversed, or the first processor 14 may simultaneously execute steps S25 and S26.

In step S27, the first processor 14 waits for completion of the exchange of the capsule 106 (or the capsule 106 and the atomizer 104). After the exchange of the capsule 106 is completed, the process advances to step S28, and the first processor 14 cancels the inhibition of the power supply control of the heater HT and returns to step S11.

In the aerosol generation system described above, in order to achieve power saving, each of the first processor 14 of the controller 102 and the second processor 32 of the external power supply 200 has an operation mode and a sleep mode in which power consumption is lower than in the operation mode. More specifically, the first processor 14 can have the zeroth operation mode in which energization control of the heater HT (that is, atomization control of the aerosol source) can be performed, the first operation mode in which charging of the first power supply BAT1 can be performed, and the first sleep mode in which power consumption is lower than in the first operation mode. The second processor 32 can have the second operation mode in which control of power supply to the controller 102 (first power supply BAT1) can be performed, and the second sleep mode in which power consumption is lower than in the second operation mode. When each of the first processor 14 and the second processor 32 has the operation mode and the sleep mode as described above, there may be demand to improve the responsiveness to a user operation in the aerosol generation system. That is, it is desirable that the operation mode and the sleep mode are switched appropriately (for example, at appropriate timings) in each of the first processor 14 and the second processor 32.

Figure 4:
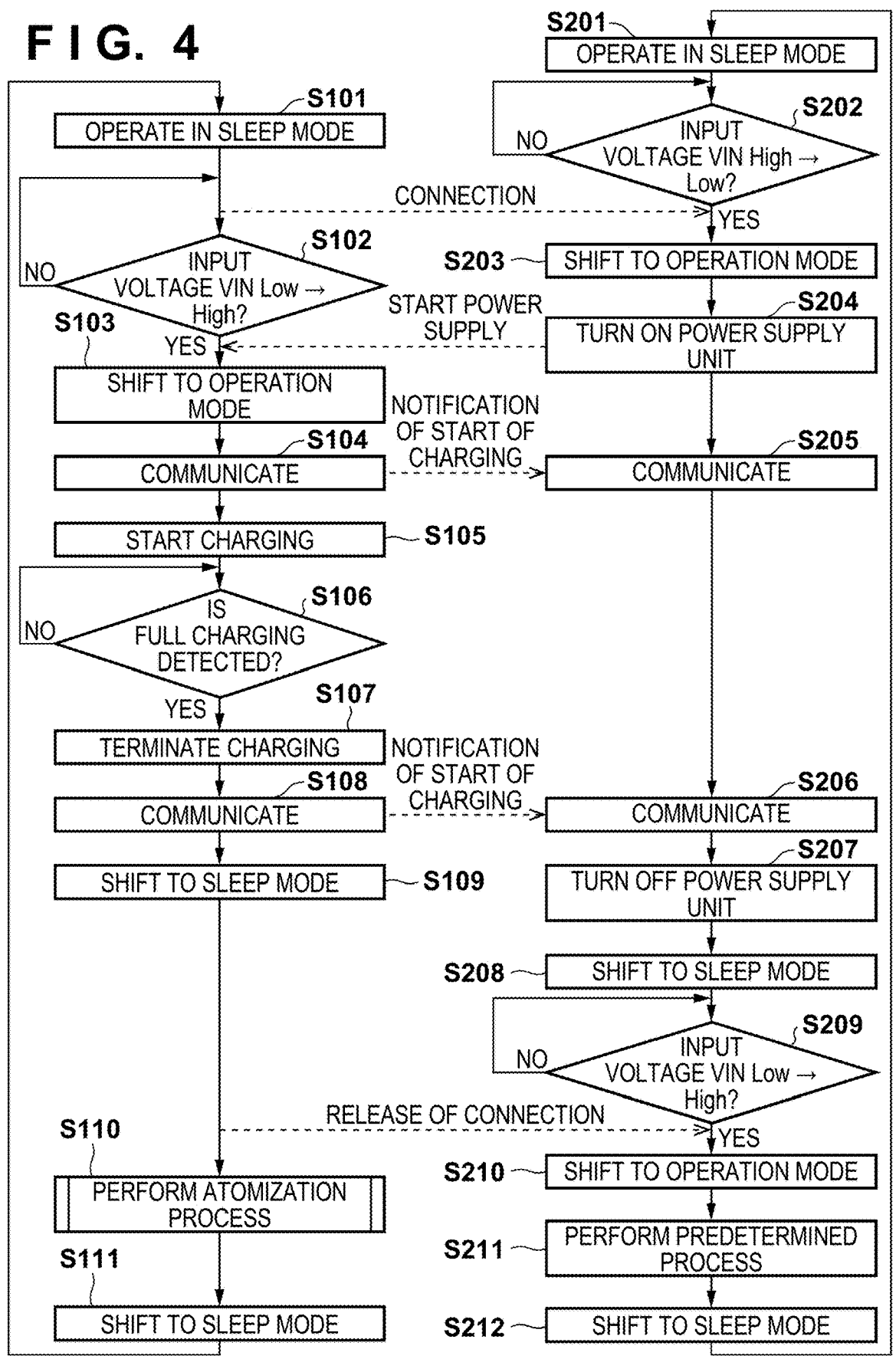
FIG. 4 is a flowchart illustrating an example of mode switching.
Figure 5:
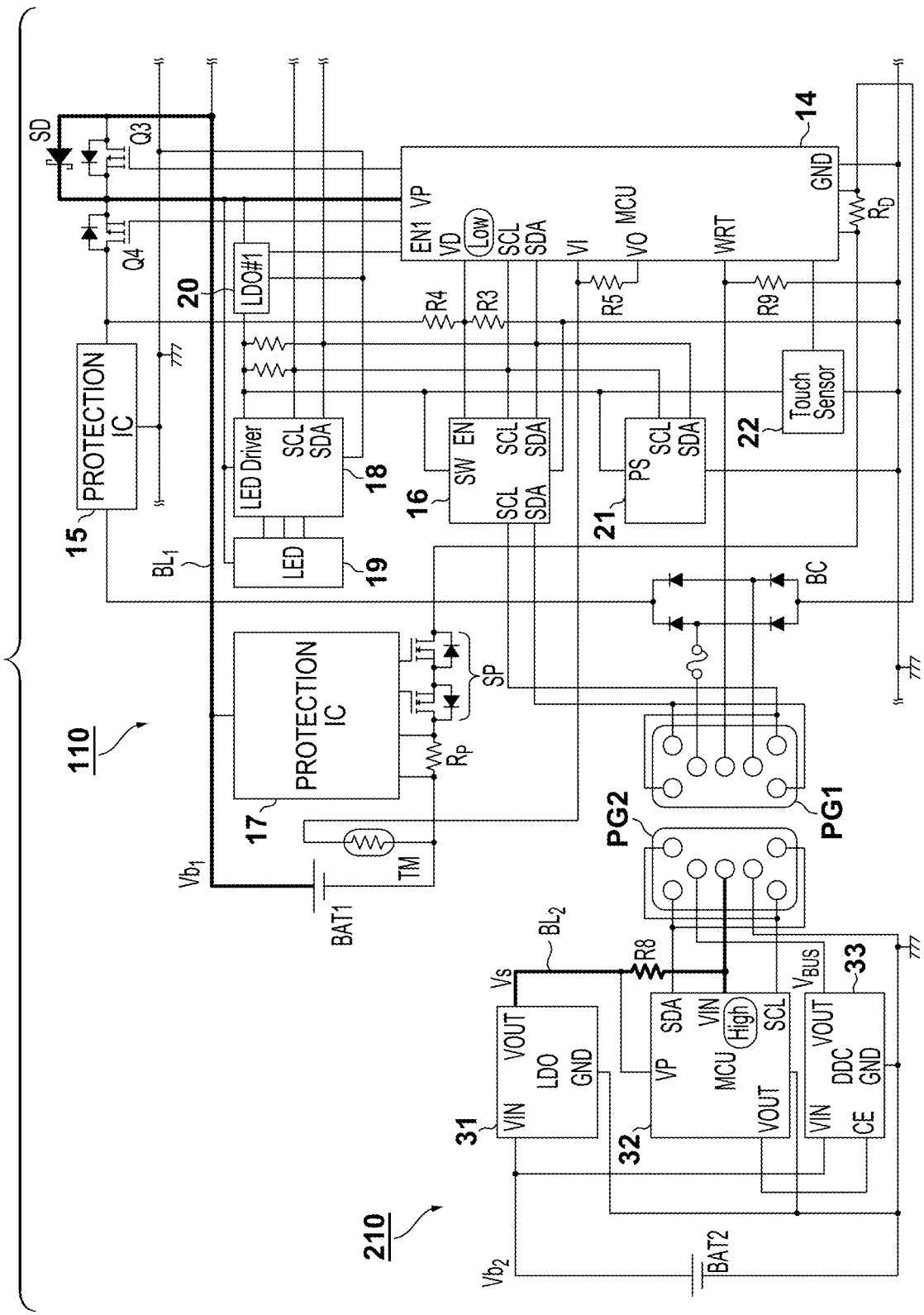
FIG. 5 is a view for explaining the mode switching.
Figure 6:
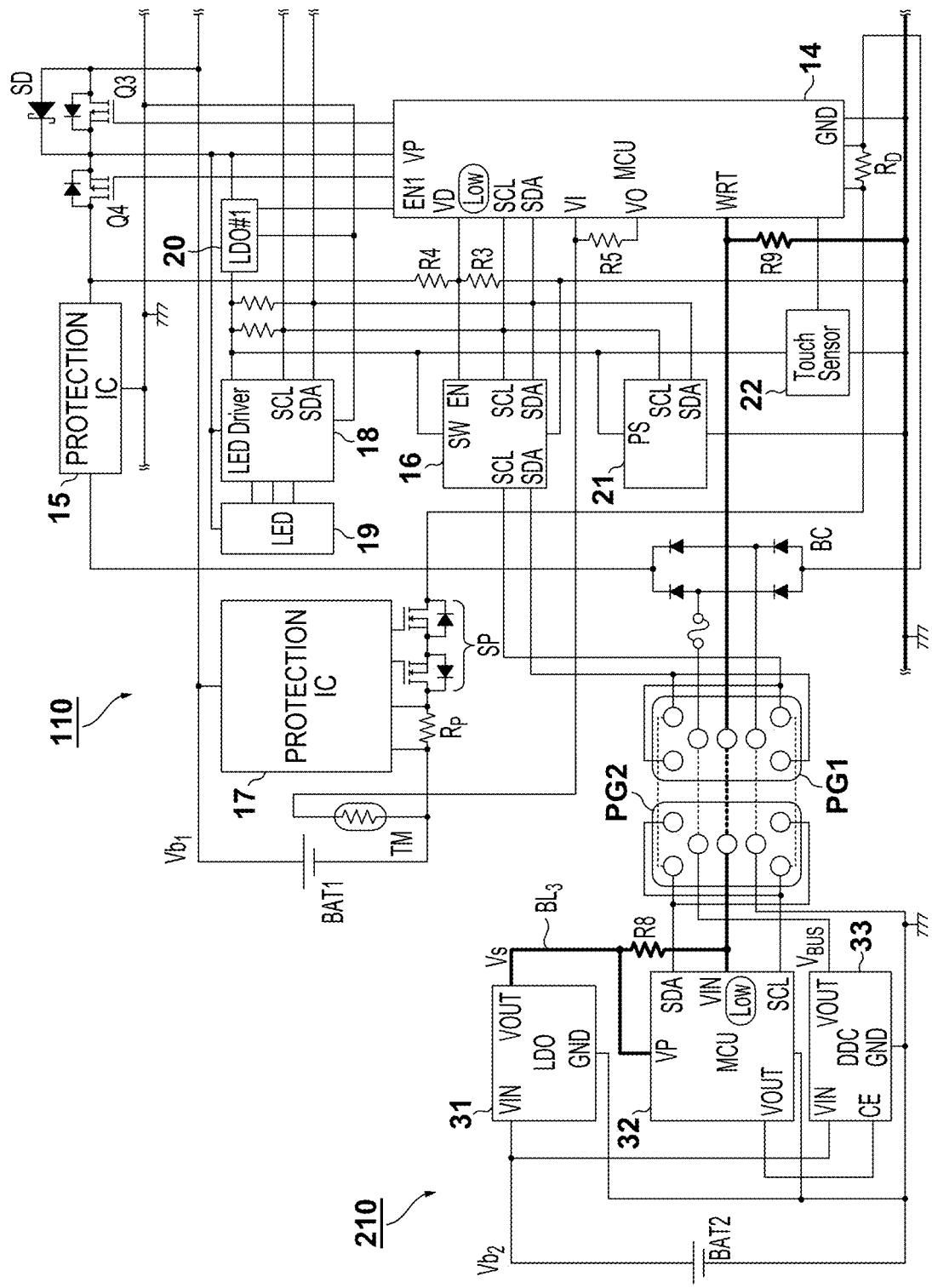
FIG. 6 is a view for explaining the mode switching.
Figure 7:
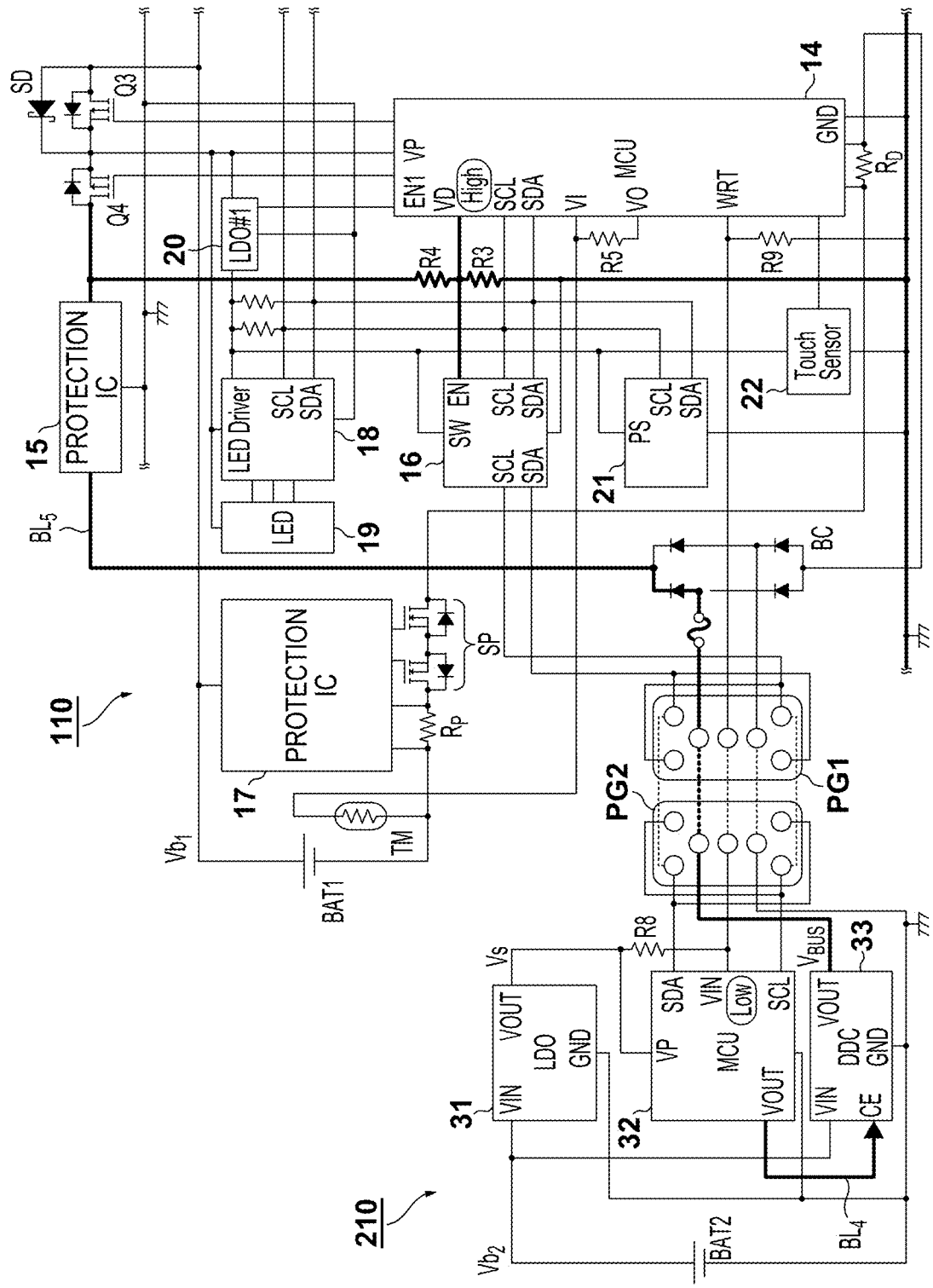
FIG. 7 is a view for explaining the mode switching.

The switching between the operation mode and the sleep mode in each of the first processor 14 of the controller 102 and the second processor 32 of the external power supply 200 will be described below. FIG. 4 illustrates an example of the switching between the operation mode and the sleep mode in each of the first processor 14 and the second processor 32. In FIG. 4, the flowchart on the left side illustrates the operation of the first processor 14, and the flowchart on the right side illustrates the operation of the second processor 32. A description of the state of each of the controller 102 and the external power supply 200 is written between the left flowchart and the right flowchart. Each of FIGS. 5 to 10 shows an arrangement example of the electrical components 110 of the controller 102 and the electrical components 210 of the external power supply 200, and they are used to explain the processing of the flowcharts illustrated in FIG. 4. The arrangement example shown in each of FIGS. 5 to 10 is similar to the arrangement example shown in FIG. 2, but the arrangement on the right side of the first processor 14 (the circuit arrangement for supplying power to the heater HT) is not illustrated. Each bold line in FIGS. 5 to 10 indicates the portion to pay attention to in the description of the processing.

Step S101 corresponds to a state in which the controller 102 is electrically disconnected from the external power supply 200, and the operation unit 116b of the user interface 116 is not operated. Step S201 corresponds to a state in which the controller 102 is electrically disconnected from the external power supply 200 and the operation unit 203b of the user interface 203 is not operated. The state in which the controller 102 is electrically disconnected from the external power supply 200 is a state in which the first connector PG1 of the controller 102 is not connected to the second connector PG2 of the external power supply 200. In this state, the input voltage at the voltage detection terminal VD of the first processor 14 is in Low level, so the voltage equal to or higher than the predetermined threshold value is not detected at the voltage detection terminal VD. In addition, no detection signal is supplied from the puff sensor 21 and the touch sensor 22 forming the operation unit 116b to the first processor 14. In this case, the first processor 14 determines that the voltage $V_{BUS}$ of the power supply unit 33 of the external power supply 200 is not applied and the operation unit 116b is not operated, and operates in the first sleep mode (step S101). Note that in this case, the first processor 14 can be operated by the voltage $Vb_1$ of the first power supply BAT1 applied via the diode SD as indicated by a bold line $BL_1$ in FIG. 5. On the other hand, as indicated by a bold line $BL_2$ in FIG. 5, the output voltage Vs of the voltage conversion circuit 31 is applied to the input terminal VIN of the second processor 32 via the resistor R8, so that the input terminal VIN is in High level. In addition, no detection signal is supplied from the operation unit 203b to the second processor 32. In this case, the second processor 32 operates in the second sleep mode (step S201).

In the second sleep mode, the second processor 32 detects whether the voltage at the input terminal VIN changes from High level to Low level (step S202). If the voltage at the input terminal VIN changes from High level to Low level, the second processor 32 advances to step S203 and shifts from the second sleep mode to the second operation mode. For example, when the controller 102 is inserted into the accommodation portion 201 of the external power supply 200 and the first connector PG1 is electrically connected to the second connector PG2, as indicated by a bold line $BL_3$ in FIG. 6, the output terminal VOUT of the voltage conversion circuit 31 is connected to the ground line of the controller 102 via the resistors R8 and R9. Therefore, the voltage Vs is divided by the resistors R8 and R9, and the voltage at the input terminal VIN of the second processor 32 changes from High level to Low level. With this, the second processor 32 can detect the connection between the first connector PG1 and the second connector PG2. Triggered by such a change in voltage at the input terminal VIN, the second processor 32 can shift from the second sleep mode to the second operation mode (step S203). Note that if the voltage at the input terminal VIN does not change from High level to Low level, the second processor 32 executes step S202 again.

Then, in step S204, the second processor 32 starts power supply to the controller 102. For example, as indicated by a bold line $BL_4$ in FIG. 7, the second processor 32 can start power supply to the controller 102 by supplying a control signal to the power supply unit 33 (CE terminal) and setting the power supply unit 33 in an ON state. At this time, the voltage $V_{BUS}$ is output from the output terminal VOUT of the power supply unit 33.

While the second processor 32 executes steps S202 and S203, the first processor 14 is in the first sleep mode and determines whether the voltage at the voltage detection terminal VD changes from Low level to High level (step S102). If the voltage at the voltage detection terminal VD changes from Low level to High level, the first processor 14 advances to step S103 and shifts from the first sleep mode to the first operation mode. For example, if step S204 is executed in the second processor 32, as indicated by a bold line $BL_5$ in FIG. 7, the output terminal VOUT of the power supply unit 33 is connected to the ground line via the bridge circuit BC, the protection circuit 15, and the resistors R4 and R3 of the controller 102. When the voltage obtained by dividing the voltage $V_{BUS}$ by the resistors R4 and R3 is input to the voltage detection terminal VD, the input voltage at the voltage detection terminal VD of the first processor 14 changes from Low level to High level, and the voltage equal to or higher than the predetermined threshold value is detected at the voltage detection terminal VD. With this, the first processor 14 can detect the start of power supply by the external power supply 200 (power supply unit 33). Triggered by such a change in input voltage at the voltage detection terminal VD, the first processor 14 can shift from the first sleep mode to the first operation mode (step S103). Further, at this time, the input voltage at the EN terminal of the switch circuit 16 also changes from Low level to High level. Triggered by this change, the switch circuit 16 connects the communication lines (SDA and SCL) between the first processor 14 and the second processor 32 to enable communication therebetween. Note that if the voltage at the voltage detection terminal VD does not change from Low level to High level, the first processor 14 executes step S102 again.

Figure 8:
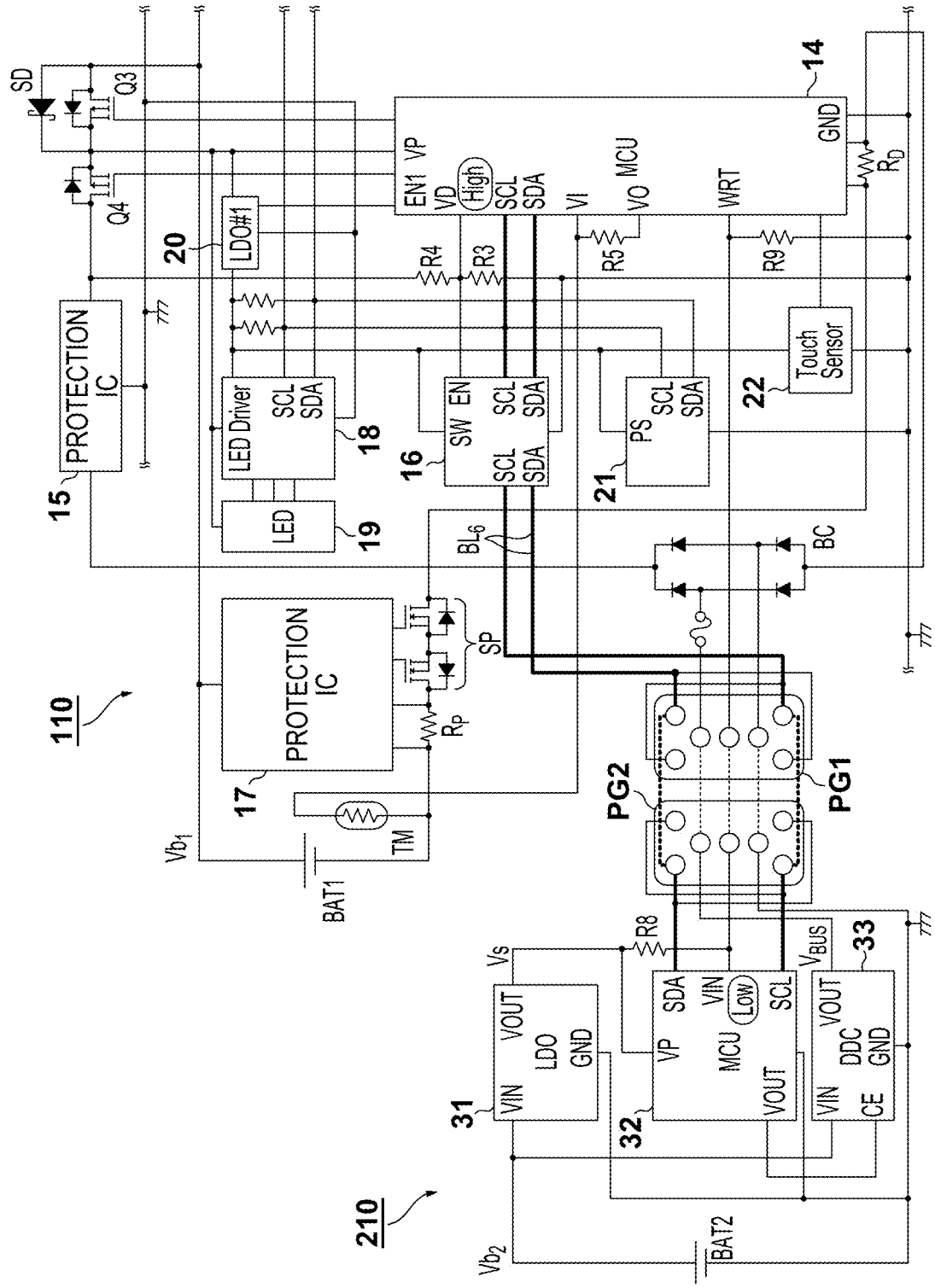
FIG. 8 is a view for explaining the mode switching.
Figure 9:
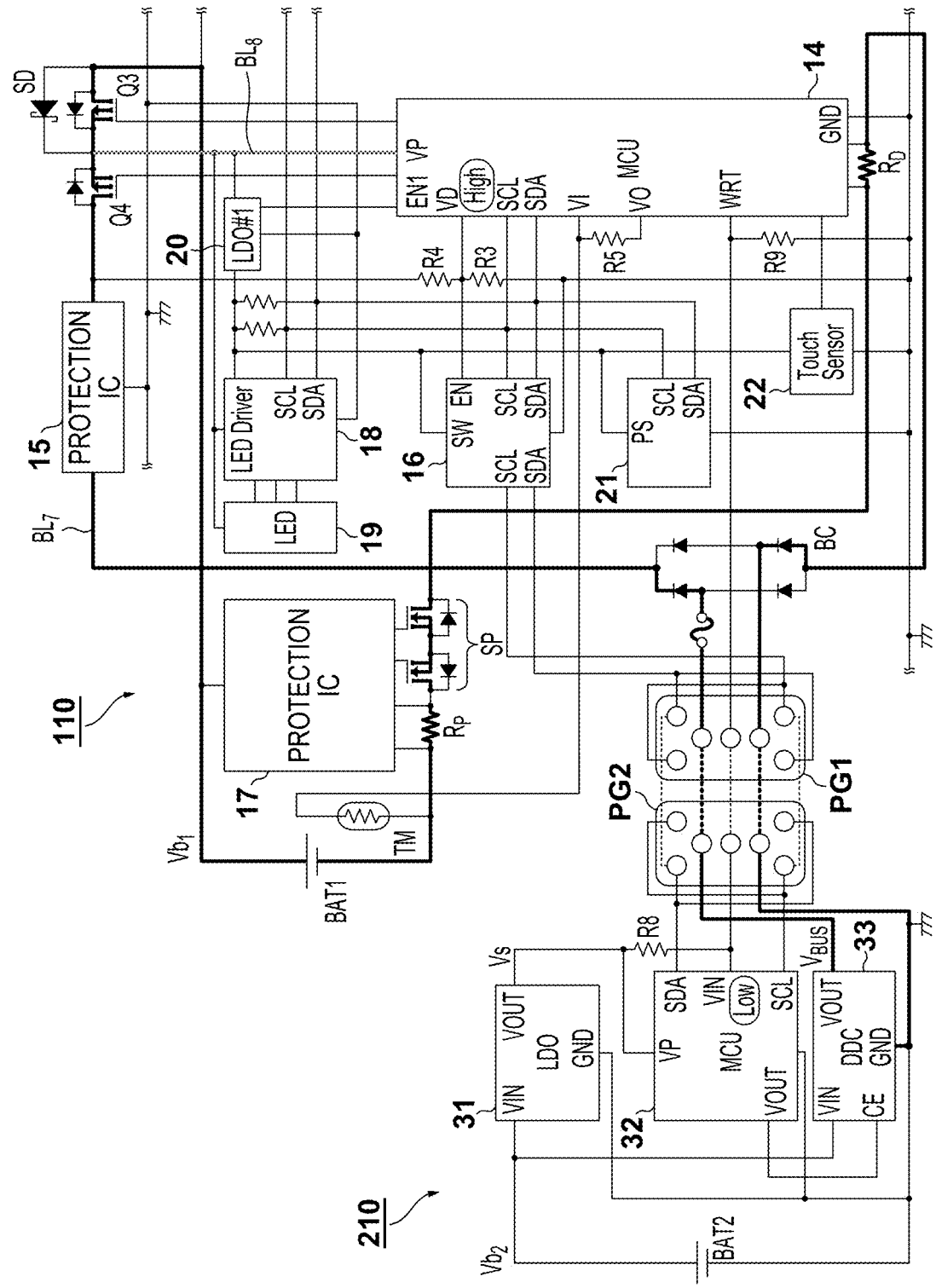
FIG. 9 is a view for explaining the mode switching.
Figure 10:
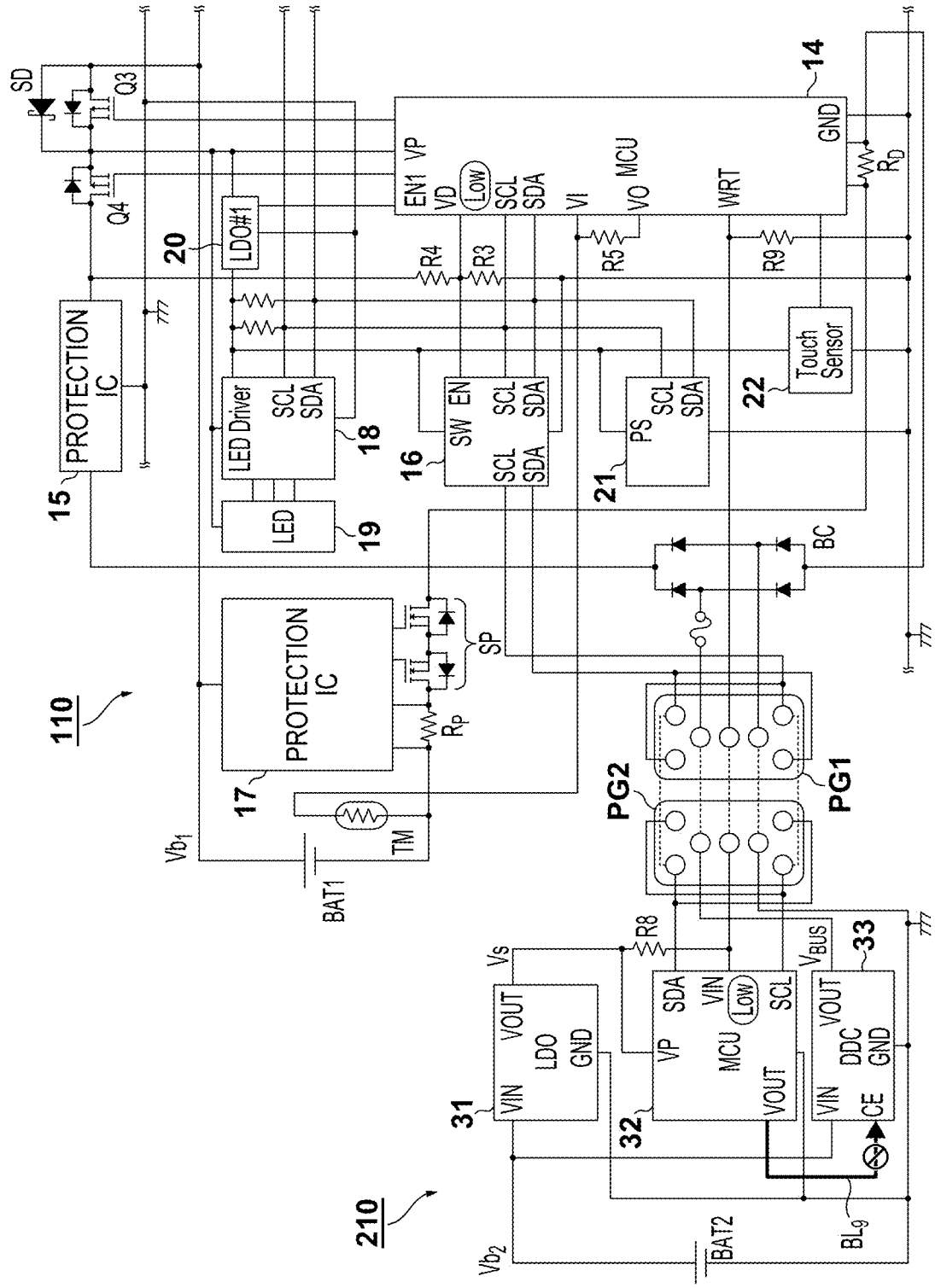
FIG. 10 is a view for explaining the mode switching.

After the first processor 14 shifts to the first operation mode, in step S104, as indicated by bold lines $BL_6$ in FIG. 8, the first processor 14 transmits signals for notifying the start of charging to the first power supply BAT1 to the second processor 32 via the switch circuit 16. On the other hand, in step S205, the second processor 32 receives the signals. At this time, the second processor 32 may notify, using the display unit 203a of the user interface 203, information indicating that charging to the first power supply BAT1 is started and/or the first power supply BAT1 is during charging. For example, this notification can be lighting (or blinking) of the LED included in the display unit 203a.

Then, in step S105, the first processor 14 starts charging to the first power supply BAT1. For example, the first processor 14 turns on the switches Q3 and Q4. With this, as indicated by a bold line $BL_7$ in FIG. 9, a current path connecting from the output terminal VOUT of the power supply unit 33 of the external power supply 200 to a ground terminal GND of the power supply unit 33 via the bridge circuit BC, the protection circuit 15, the switch Q4, the switch Q3, and the first power supply BAT1 is formed, and charging of the first power supply BAT1 can be performed. The charging of the first power supply BAT1 may be performed by dropper control of the switch Q3 performed by the first processor 14 as has been described above. Note that in this case, as indicated by a gray bold line $BL_8$ in FIG. 9, the first processor 14 can be operated by the voltage on the line connecting the switch Q3 and the switch Q4 (that is, the output voltage $V_{BUS}$ of the power supply unit 33 of the external power supply 200).

In step S106, the first processor 14 determines whether it detects full charging of the first power supply BAT1. The full charging of the first power supply BAT1 means that charging of the first power supply BAT1 to a target capacity is completed. The target capacity is not limited to 100% of the maximum capacity of the first power supply BAT1, but can be arbitrarily set to 90% or 80% of the maximum capacity. Alternatively, the full charging of the first power supply BAT1 may mean that the charging current during the charging of the first power supply BAT1 with a predetermined voltage becomes smaller than a threshold value. A specific example of the predetermined voltage is the full charging voltage of the first power supply BAT1. If the full charging of the first power supply BAT1 is detected in step S106, the first processor 14 advances to step S107, and terminates the charging to the first power supply BAT1. If the full charging of the first power supply BAT1 is not detected in step S106, the first processor 14 continues the charging of the first power supply BAT1 and executes step S106 again. Then, in step S108, the first processor 14 transmits a signal for notifying the termination of charging to the first power supply BAT1 to the second processor 32 via the switch circuit 16 and, in step S109, shifts from the first operation mode to the first sleep mode.

When the user performs an inhalation operation of a gas containing an aerosol using the inhalation device 100, the controller 102 is removed from the accommodation portion 201 of the external power supply 200. That is, the connection between the first connector PG1 of the controller 102 and the second connector PG2 of the external power supply 200 is released. Then, in step S110, the first processor 14 performs an atomization process in accordance with an atomization request from the user. The atomization process is performed in the zeroth operation mode described above. In other words, the first processor 14 shifts to the zeroth operation mode. For example, the first processor 14 can control the atomization process in accordance with the flowchart of FIG. 3. Here, if the first atomization request is detected in step S11 of FIG. 3, the first processor 14 can shift from the first sleep mode to the zeroth operation mode and perform the atomization process in accordance with the flowchart of FIG. 3. Then, if the flowchart (step S29) of FIG. 3 is terminated or no next atomization request is detected for a predetermined period after the end of the atomization, the process advances to step S11 of FIG. 4, and the first processor 14 can shift from the zeroth operation mode to the first sleep mode.

On the other hand, if the signal for notifying the termination of charging to the first power supply BAT1 is received from the first processor 14 (step S206), the second processor 32 advances to step S207, and terminates the power supply to the controller 102. For example, by terminating the supply of the control signal to the power supply unit 33 (CE terminal) and setting the power supply unit 33 in an OFF state as indicated by a bold line $BL_9$ in FIG. 10, the second processor 32 can terminate the power supply to the controller 102. Note that the second processor 32 may set the power supply unit 33 in the OFF state by supplying, to the power supply unit 33 (CE terminal), a control signal for stopping the output of the voltage $V_{OUT}$ from the output terminal VOUT. After terminating the power supply to the controller 102, the second processor 32 advances to step S208, and shifts from the second operation mode to the second sleep mode.

Here, if the signal for notifying the termination of charging to the first power supply BAT1 is received from the first processor 14, the second processor 32 may notify, using the display unit 203a of the user interface 203, information indicating that charging to the first power supply BAT1 is terminated or the like. For example, this notification can be lighting (or blinking) of the LED included in the display unit 203a and/or turning off the lit or blinked LED.

In step S209, the second processor 32 detects whether the voltage at the input terminal VIN changes from Low level to High level. For example, when the controller 102 is removed from the accommodation portion 201 of the external power supply 200 and the connection between the first connector PG1 and the second connector PG2 is released, the connection between the input terminal VIN of the second processor 32 and the resistor R9 of the controller 102 is released as indicated by the bold line $BL_2$ in FIG. 5, so that the voltage at the input terminal VIN changes from Low level to High level. With this, the second processor 32 can detect the release of connection between the first connector PG1 and the second connector PG2. If a change in voltage at the input terminal VIN from Low level to High level is not detected, the second processor 32 executes step S209 again.

If a change in voltage at the input terminal VIN is detected in step S209, the second processor 32 advances to step S210, and shifts from the second sleep mode to a predetermined operation mode. Then, the second processor 32 performs a predetermined process in step S211, and advances to step S212 to shift from the predetermined operation mode to the second sleep mode. Here, the predetermined process can be, for example, notification, using the display unit 203a of the user interface 203, of information indicating the release of connection between the first connector PG1 and the second connector PG2. This notification can be lighting (or blinking) of the LED included in the display unit 203a. The predetermined process may be a process other than the notification.

With the arrangement and process described above, in the aerosol generation system according to this embodiment, the operation mode and the sleep mode can be switched in each of the first processor 14 of the controller 102 and the second processor of the external power supply 200 with appropriate timings and a simple circuit arrangement. Therefore, according to the aerosol generation system according to this embodiment, it is possible to achieve both power saving and an improvement in responsiveness to a user operation.

The invention is not limited to the foregoing embodiments, and various variations/changes are possible within the spirit of the invention.

What is claimed is:

1. An aerosol generation system comprising:
a controller for an inhalation device, the controller including a first power supply, a first connector, a first resistor, and a first processor configured to perform energization control of a heater which is used to heat an aerosol source, and
a power supply device including a second power supply, a second connector which is electrically connected to the first connector at the time of charging of the first power supply, a second resistor, and a second processor configured to perform control of power supply from the second power supply to the controller via the second connector,
wherein the first processor has a first operation mode in which charging of the first power supply can be performed, and a first sleep mode in which power consumption is lower than in the first operation mode,
the second processor has a second operation mode in which the control of power supply can be performed, and a second sleep mode in which power consumption is lower than in the second operation mode,
the second processor includes a first voltage detection terminal connected to a voltage source via the second resistor, shifts from the second sleep mode to the second operation mode in a case where a voltage detected at the first voltage detection terminal changes from High level to Low level as detection of an electrical connection between the first connector and the second connector, and then starts power supply to the controller,
the first processor shifts from the first sleep mode to the first operation mode in accordance with the start of the power supply by the second processor, and
the first voltage detection terminal is connected to a ground line via the first resistor in a case where the first connector is connected to the second connector, and the voltage detected at the first voltage detection terminal changes from High level to Low level in accordance with connecting the first voltage detection terminal to the ground line.

2. The system according to claim 1, wherein
the first processor starts, after shifting from the first sleep mode to the first operation mode, charging of the first power supply.

3. The system according to claim 1, wherein
the second processor switches between the second sleep mode and the second operation mode in accordance with a change in a voltage detected at the first voltage detection terminal, which is caused by a connection between the first connector and the second connector.

4. The system according to claim 1, wherein
a resistance value of the second resistor is larger than a resistance value of the first resistor.

5. The system according to claim 1, wherein
the second processor includes a power supply terminal, and
an input voltage to the power supply terminal is equal to a voltage applied to the first resistor and the second resistor connected in series.

6. The system according to claim 5, wherein
the power supply terminal is connected to the voltage source.

7. The system according to claim 1, wherein
in a case where the voltage detected at the first voltage detection terminal changes from Low level to High level, the second processor performs a predetermined process in a predetermined operation mode, in which power consumption is higher than in the second sleep mode, and then shifts from the predetermined operation mode to the second sleep mode.

8. The system according to claim 7, wherein
the power supply device further comprises a display unit configured to provide a user with information, and
the predetermined process includes providing the information by the display unit.

9. The system according to claim 1, wherein
the first processor includes a second voltage detection terminal connected to a line used to perform the power supply from the power supply device, and shifts from the first sleep mode to the first operation mode in accordance with a change in a voltage detected at the second voltage detection terminal, which is caused by the power supply.

10. The system according to claim 9, wherein
the power supply device includes a power supplier configured to supply power from the second power supply to the controller, and
in a case where the first connector is connected to the second connector, a line connecting the second voltage detection terminal and an output terminal of the power supply unit is formed.

11. The system according to claim 9, wherein
the controller includes a protection circuit provided on a line connecting the second voltage detection terminal and the first connector, and configured to prevent an overcurrent to the first power supply.

12. The system according to claim 1, wherein
the controller includes a switch circuit configured to form communication lines between the first processor and the second processor, in accordance with the start of the power supply by the second processor.

13. The system according to claim 12, wherein
the first processor starts charging of the first power supply after shifting from the first sleep mode to the first operation mode, and transmits a first signal for notifying start of charging to the first power supply to the second processor via the switch circuit.

14. The system according to claim 13, wherein
the second processor notifies information indicating that charging to the first power supply is started and/or the first supply is during charging, in accordance with receiving the first signal.

15. The system according to claim 12, wherein
the first processor, in a case of terminating charging to the first power supply, transmits a second signal for notifying termination of charging to the first power supply to the second processor via the switch circuit, and
the second processor terminates the power supply to the controller in accordance with receiving the second signal.

16. The system according to claim 15, wherein
the second processor shifts from the second operation mode to the second sleep mode after terminating the power supply to the controller.

17. A power supply device of a controller for an inhalation device, the controller performing energization control of a heater which is used to heat an aerosol, the power supply device comprising
a power supply, a second connector to be connected to a first connector of the controller, a first resistor, and a processor configured to perform control of power supply from the power supply to the controller,
wherein the processor has an operation mode in which the control of power supply can be performed, and a sleep mode in which power consumption is lower than in the operation mode,
the processor includes a voltage detection terminal connected to a voltage source via the first resistor, shifts from the sleep mode to the operation mode in a case where a voltage detected at the voltage detection terminal changes from High level to Low level as detection of a connection between the first connector and the second connector, and then starts power supply from the power supply to the controller via the second connector, and
the voltage detection terminal is connected to a ground line via a second resistor of the controller in a case where the first connector is connected to the second connector, and the voltage detected at the voltage detection terminal changes from High level to Low level in accordance with connecting the voltage detection terminal to the ground line.

* * * * *